United States Patent
Johnston et al.

(10) Patent No.: US 6,822,748 B2
(45) Date of Patent: Nov. 23, 2004

(54) CALIBRATION FOR 3D MEASUREMENT SYSTEM

(75) Inventors: Kyle S. Johnston, Sammamish, WA (US); Charles M. Bass, Kirkland, WA (US)

(73) Assignee: Metron Systems, Inc., Snoqualmie, WA (US)

( * ) Notice: Subject to any disclaimer, the term of this patent is extended or adjusted under 35 U.S.C. 154(b) by 0 days.

(21) Appl. No.: 10/696,199

(22) Filed: Oct. 29, 2003

(65) Prior Publication Data

US 2004/0141187 A1 Jul. 22, 2004

Related U.S. Application Data

(60) Provisional application No. 60/421,916, filed on Oct. 29, 2002.

(51) Int. Cl.[7] ............................................... G01B 11/30
(52) U.S. Cl. ..................... 356/608; 356/601; 356/243.1
(58) Field of Search ................................ 356/608, 601, 356/627, 628, 639, 640, 243.1

(56) References Cited

U.S. PATENT DOCUMENTS

| | | |
|---|---|---|
| 1,540,752 A | 6/1925 | Bielicke |
| 4,277,141 A | 7/1981 | Kleiber |
| 4,498,778 A | 2/1985 | White |
| 4,567,347 A | 1/1986 | Ito et al. |
| 4,628,469 A | 12/1986 | White |
| 4,639,140 A | 1/1987 | Lerat |
| 4,759,593 A | 7/1988 | Kessler |
| 4,863,268 A | 9/1989 | Clarke et al. |
| 4,880,299 A | 11/1989 | Hamada |
| 4,932,784 A | 6/1990 | Danneskiold-Samsoe |
| 4,957,369 A | * 9/1990 | Antonsson ................... 356/608 |
| 4,979,816 A | 12/1990 | White |
| 5,004,929 A | 4/1991 | Kakinoki et al. |
| 5,149,963 A | 9/1992 | Hassler, Jr. |
| 5,151,608 A | 9/1992 | Torii et al. |
| 5,157,486 A | 10/1992 | Baird et al. |
| 5,171,984 A | 12/1992 | Van Rosmalen |
| 5,172,001 A | * 12/1992 | Spizzamiglio ............ 250/559.2 |
| 5,245,182 A | 9/1993 | Van Rosmalen et al. |
| 5,450,219 A | 9/1995 | Gold et al. |
| 5,489,985 A | 2/1996 | Mochida et al. |

(List continued on next page.)

FOREIGN PATENT DOCUMENTS

| | | |
|---|---|---|
| EP | 0377973 | 7/1990 |
| EP | 0618472 | 10/1994 |
| JP | 03198650 | 8/1991 |

OTHER PUBLICATIONS

A Real–time Optical Profile Sensor For Robot Arc Welding, Oomen et al, Proceedings Of The SPIE, vol. 449, Intelligent Robots: RoViSeC3, 1983, pp. 62–71.

Science Applications International Corporation, "Recent Applications of Laser Line Scan Technology and Data Processing", SAIC Science and Technology Trends, 1998, pp. 190–195.

"Motor/Polygon Speed Stability Definition and Measurement", Lincoln Laser Scanning Systems, 1993, Appl. Note #214, pp., 1–4.

Planar Substrate Surface Plasmon Resonance Probe with Multivariate Calibration (section entitled "2. Theory of Light Pipe SPR Sensors"), Ph.D. Dissertation, Univ. Washington, 1996, Kyle S. Johnston, 25 pages.

*Primary Examiner*—Frank G. Font
*Assistant Examiner*—Roy M. Punnoose
(74) *Attorney, Agent, or Firm*—Reed Smth LLP; Matthew J. Esserman

(57) ABSTRACT

Calibration techniques are disclosed for determining the rigid-body coordinate transformation that will precisely align the coordinate frame of a laser scanner with the coordinate frames of several different motion axes. The theory and use of at least these concepts are introduced by examining how these concepts aid the construction and use of a non-contact laser scanning system.

41 Claims, 3 Drawing Sheets

U.S. PATENT DOCUMENTS

| | | |
|---|---|---|
| 5,550,668 A | 8/1996 | Appel et al. |
| 5,617,133 A | 4/1997 | Fisli |
| 5,739,912 A | 4/1998 | Ishii |
| 5,754,215 A | 5/1998 | Kataoka et al. |
| 5,777,311 A | 7/1998 | Keinath et al. |
| 5,789,743 A | 8/1998 | Van Rosmalen |
| 5,828,479 A | 10/1998 | Takano et al. |
| 5,864,394 A | 1/1999 | Jordan, III et al. |
| 6,046,801 A | 4/2000 | Liu et al. |
| 6,151,564 A | 11/2000 | Vescovi et al. |
| 6,205,406 B1 | 3/2001 | Hahn et al. |
| 6,369,401 B1 * | 4/2002 | Lee ................ 250/559.21 |
| 6,441,908 B1 | 8/2002 | Johnston et al. |
| 6,600,168 B1 * | 7/2003 | Geng ................ 250/559.22 |

* cited by examiner

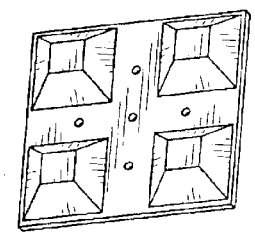
FIG. 2c
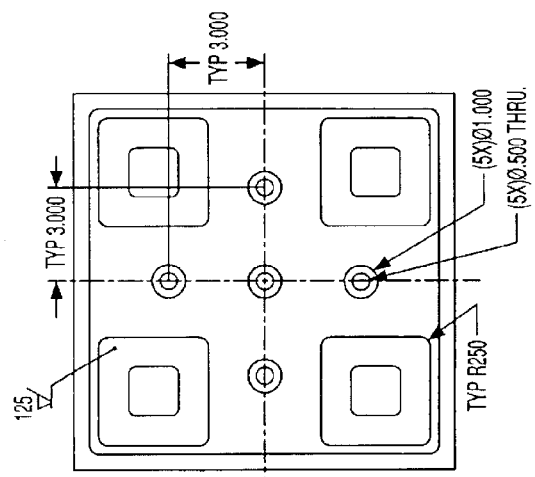
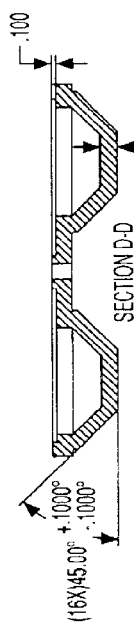
FIG. 2e
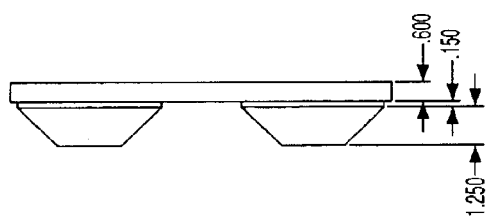
FIG. 2b
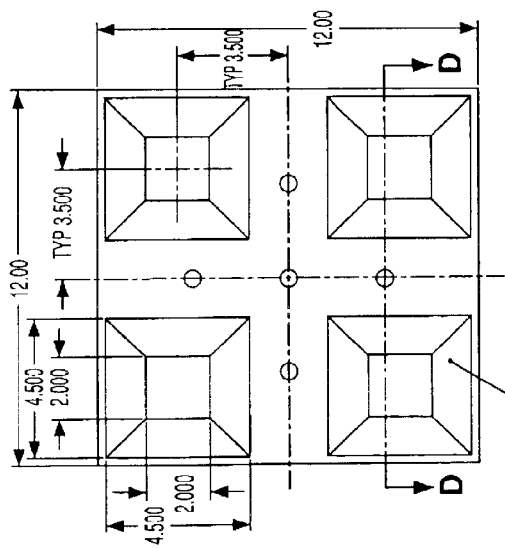
FIG. 2a
FIG. 2d

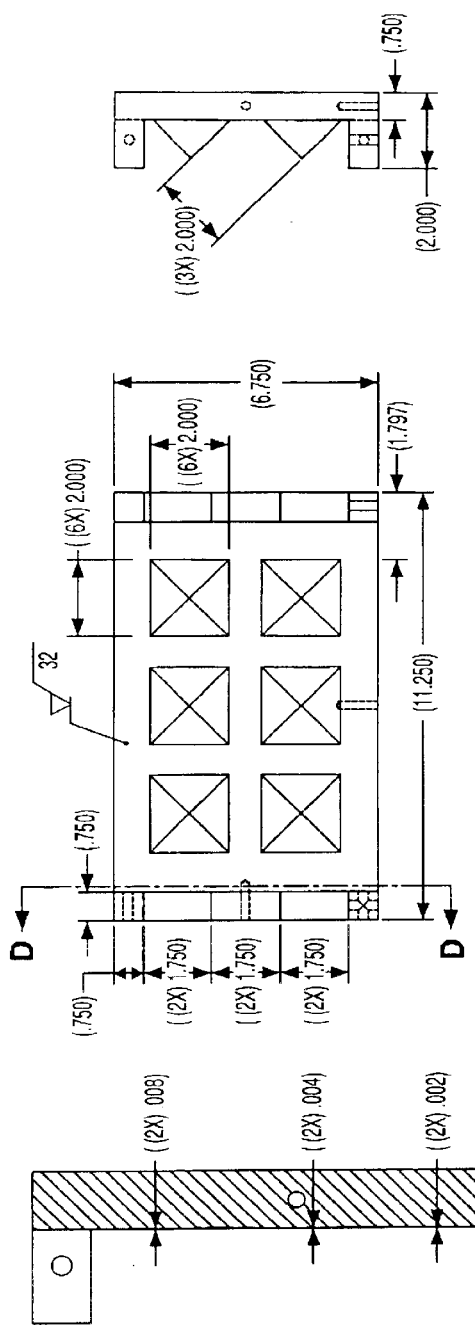
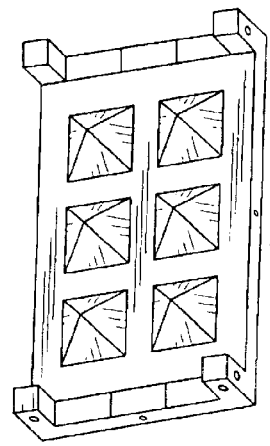
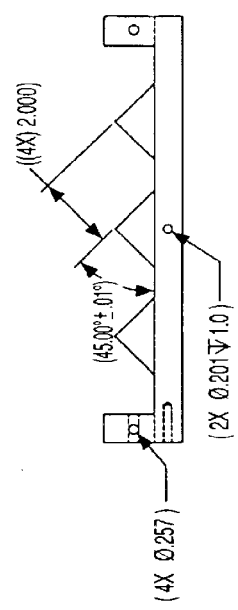
FIG. 3a
FIG. 3b
FIG. 3c
FIG. 3d
FIG. 3e

CALIBRATION FOR 3D MEASUREMENT SYSTEM

This application claims priority from provisional application 60/421,916, filed Oct. 29, 2002.

FIELD OF THE INVENTION

The present invention relates to the field of non-contact laser scanner profilometer systems and calibration techniques for such systems.

BACKGROUND OF THE INVENTION

The present invention describes highly accurate techniques for calibrating 3D measurement systems. The theory and use of these inventions are introduced by examining how these inventions aid the construction and use of a non-contact laser scanning system. A body of useful prior art for this work is described in U.S. Pat. No. 6,441,908, issued to Johnston et al.

These and other advantages of the present invention will become more fully apparent from the detailed description of the invention hereinbelow.

SUMMARY OF THE INVENTION

The present invention is directed to a method for providing calibrated geometric data from a three dimensional measurement system, the method comprising: providing a reference object having a predetermined geometric structure; providing reference object geometric structure data in a first coordinate frame, wherein the reference object geometric structure data corresponds to the predetermined geometric structure; providing a three dimensional measurement system comprising: a measurement element that measures geometric data in a second coordinate frame from the reference object and from a target object; and a motion system that provides relative motion between the reference object and the measurement element, wherein the relative motion occurs in a third coordinate frame, wherein the three dimensional measurement system provides motion data in the third coordinate frame corresponding to the relative motion; acquiring a geometric data set comprising the measured geometric data from the reference object by the measurement element as a result of the relative motion provided by the motion system, wherein the geometric data set further comprises the motion data; determining a first transformational relationship between the second coordinate frame and the third coordinate frame, wherein the first transformational relationship is determined using the measured geometric data and the motion data contained within the geometric data set, and using the reference object geometric structure data; and providing calibrated geometric data in a single coordinate frame from the target object by using the first transformational relationship.

The present invention is also directed to a method for providing calibrated geometric data from a three dimensional measurement system, the method comprising: providing a reference object having a predetermined geometric structure; providing reference object geometric structure data in a first coordinate frame, wherein the reference object geometric structure data corresponds to the predetermined geometric structure; providing a three dimensional measurement system comprising: a measurement element that measures geometric data in a second coordinate frame from the reference object and from a target object; a first support system that supports the measurement element, wherein the first support system resides within a third coordinate frame, wherein the first support system is capable of supporting the measurement element in at least a first element position and a second element position; and a second support system that supports the reference object, wherein the second support system resides within a fourth coordinate frame, wherein the second support system is capable of supporting the reference object in at least a first object position and a second object position; wherein a first relative motion occurs between the measurement element and the reference object, wherein the three dimensional measurement system provides first motion data corresponding to the first relative motion, wherein the first motion data includes either or both first position data in the third coordinate frame from the first support system and first position data in the fourth coordinate frame from the second support system; and wherein a second relative motion occurs between the measurement element and the reference object, wherein the three dimensional measurement system provides second motion data corresponding to the second relative motion, wherein the second motion data includes either or both second position data in the third coordinate frame from the first support system and second position data in the fourth coordinate frame from the second support system; acquiring a first geometric data set comprising first measured geometric data from the reference object by the measurement element as a result of the first relative motion, wherein the first geometric data set further comprises the first motion data; acquiring a second geometric data set comprising second measured geometric data from the reference object by the measurement element as a result of the second relative motion, wherein the second geometric data set further comprises the second motion data; determining both a first transformational relationship between the second coordinate frame and the third coordinate frame, and a second transformational relationship between the first coordinate frame and the third coordinate frame, wherein both the first transformational relationship and the second transformational relationship are determined using the first measured geometric data and the first motion data contained within the first geometric data set, and using the reference object geometric structure data; determining both a third transformational relationship between the second coordinate frame and the third coordinate frame, and a fourth transformational relationship between the first coordinate frame and the third coordinate frame, wherein both the third transformational relationship and the fourth transformational relationship are determined using the second measured geometric data and the second motion data contained within the second geometric data set, and using the reference object geometric structure data; determining a fifth transformational relationship between the third coordinate frame and the fourth coordinate frame, wherein the fifth transformational relationship is determined using the second transformational relationship and the fourth transformational relationship; and providing calibrated geometric data in a single coordinate frame from the target object by using the fifth transformational relationship and using either or both of the first transformational relationship and the third transformational relationship.

BRIEF DESCRIPTION OF THE DRAWINGS

In order that the manner in which the above-recited and other advantages and objects of the invention are obtained can be appreciated, a more particular description of the invention briefly described above will be rendered by reference to a specific embodiment thereof which is illustrated in the appended drawings. Understanding that these drawings depict only a typical embodiment of the invention and are not therefore to be considered limiting of its scope, the invention and the presently understood best mode thereof will be described and explained with additional specificity and detail through the use of the accompanying drawings.

FIGS. 2a–2e illustrate several views of an preferred precision monument design nicknamed "Mayan".

FIGS. 3a–3e illustrate several views of another preferred precision monument design utilizing a 6 point pyramid monument configuration. The monument has built-in support legs that protect the monument surface and support it while standing on end. Ends of the monument contain shallow relief step gauges for verifying scanner performance.

DETAILED DESCRIPTION OF THE PREFERRED EMBODIMENTS

Figure 1:
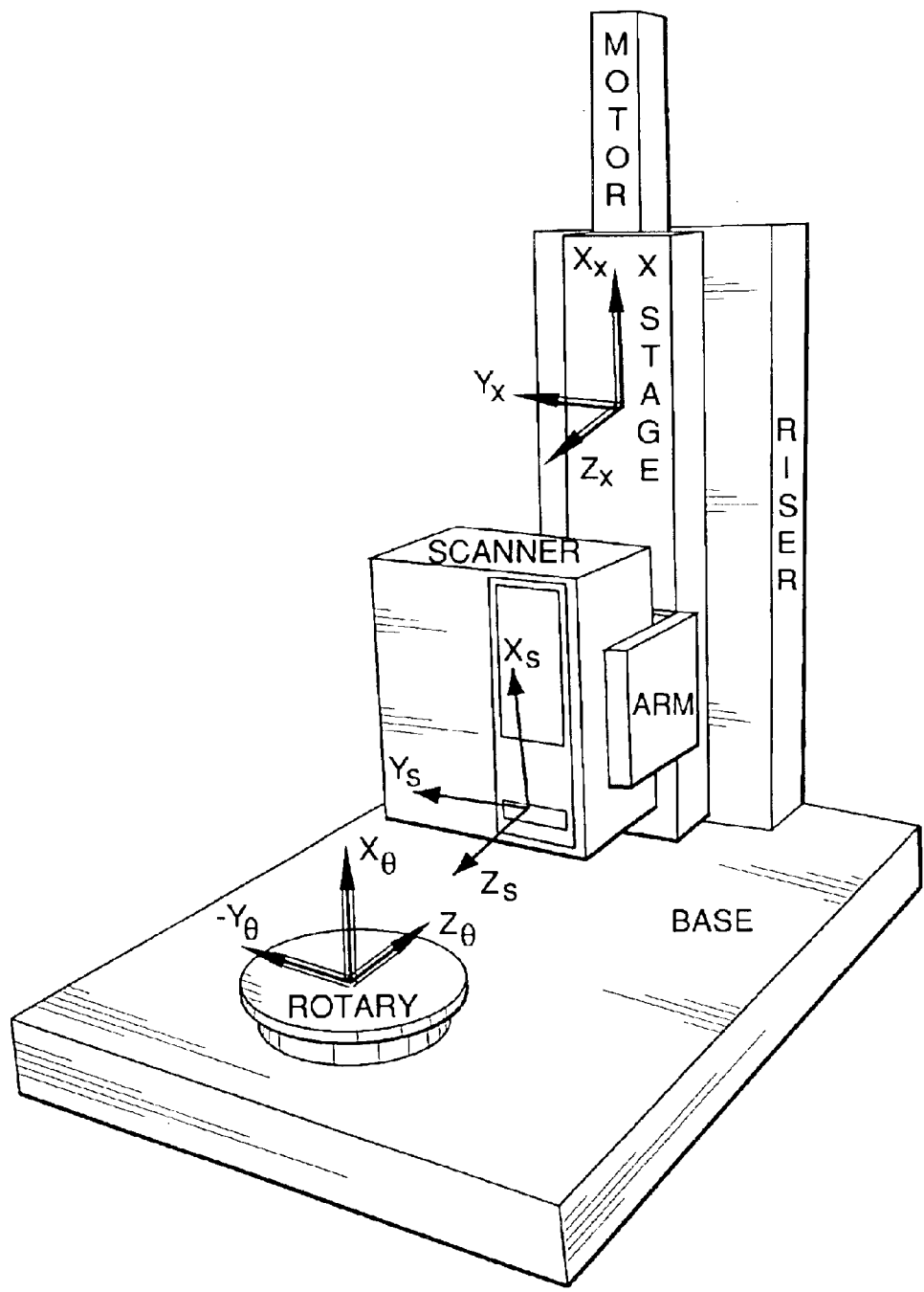
FIG. 1 is an isometric schematic view of a laser scanning system including a Rotary Stage and X Stage mounted on a rigid Base and Riser structure. The Scanner is mounted on an Arm attached to the moving portion of the X Stage. The triple line denotes the Rotary coordinate frame, double line denotes the X coordinate frame and single line denotes the Scanner coordinate frame.

Reference will now be made to the drawings wherein like structures are provided with like reference designations. It will be understood that the drawings included herewith only provide diagrammatic representations of the presently preferred structures of the present invention and that structures falling within the scope of the present invention may include structures different than those shown in the drawings.

The inventions in this disclosure are intended for, but not limited to, use in a non-contact laser scanner profilometer, similar to the systems discussed in U.S. Pat. No. 6,441,908. Examples of the implementations and identification of the preferred techniques will be made as they relate to laser scanning profilometry applications.

This disclosure describes an automatic technique for simultaneously determining the rigid-body coordinate transformation that will align the coordinate frame of a substantially 2D laser scanner with the coordinate frames of several different motion axes.

FIG. 1 shows a 3D laser scanner configuration supported by a preferred embodiment of the present invention. The system shown comprises a Laser Scanner mounted on the X Stage, a linear motion device. The X Stage is rigidly affixed to the Riser, which is in turn connected to the stable Base. The Base also supports the Rotary Stage that supports sample parts in the field of view of the Scanner. The coordinate frames of the Scanner, X Stage and Rotary Stage are also depicted.

The 2D laser scanner measures surface locations along a substantially planar cross section of a sample part placed on the Rotary Stage. The surface location data can be considered to be in the coordinate frame of the scanner. That is, each X, Y, Z surface location is specified by a set of axes and an origin location physically tied to the location of the scanner. The coordinate frame of the scanner will be identified as the SCAN FRAME and denoted with $\Phi_S$. Referring to FIG. 1, the planar field of view of the Scanner is substantially parallel to the YZ plane in $\Phi_S$.

To acquire 3D data from the surface of the part, relative motion must occur between the scanner and the part. As shown in FIG. 1, a straightforward method of accomplishing this is to attach the Scanner to a linear motion stage. It is convenient to describe the motion of this X stage in its own coordinate frame, the X FRAME, ideally aligned with the motion of the stage. The X FRAME will be denoted as $\Phi_X$.

To construct a 3D data set describing the surface locations along a part using the system in FIG. 1, the axial position information from the X stage must be accurately combined with the Scanner data to yield 3D data. However, as can be observed in FIG. 1, $\Phi_S$ is not aligned with $\Phi_X$. Therefore, directly combining the X position data to offset the Scanner data would result in a warped data set that does not accurately describe the surface of the part. The data set deformation would appear identical to a 3D shear transformation applied to the data set.

To correct the warped data, each data point in $\Phi_S$ needs to be transformed into $\Phi_X$ before it is combined with the X position data. A calibration method is required to determine the coordinate transformation, denoted $\Psi_{S2X}$ that accurately maps data from $\Phi_S$ to $\Phi_X$. The use of this transformation would allow the Scanner data to be combined with the X stage data, resulting in an accurate 3D data set in $\Phi_X$ that describes the surface of the part scanned.

A part rigidly affixed to the surface of the Rotary stage would occupy the location in FIG. 1 occupied by the axes showing the coordinate frame of the Rotary stage (θ FRAME). The θ FRAME will be denoted by $\Phi_\theta$. If the part is opaque, only one "side" or section of the part's surface can be digitized by the scanner. However, by rotating the position of the rotary stage, another section of the part's surface can be digitized. It is convenient to describe $\Phi_\theta$ such that the rotational repositioning that occurred between scans was a pure rotary motion.

Since $\Phi_\theta$ is probably not aligned with the $\Phi_X$, a method of calibration is needed to determine the coordinate frame transformation, denoted $\Psi_{X2\theta}$ that allows the digitized surface data set in $\Phi_X$ to be accurately projected into $\Phi_\theta$. However, multiple data sets projected from $\Phi_X$ would land on each other in $\Phi_\theta$ unless the rotary motion of the stage is accounted for. If the position of the rotary stage was recorded with each different data set, then a pure rotary transformation, $\Psi_\theta$ can be applied to each data set. The resulting 3D data sets in $\Phi_\theta$ can be appended together to accurately describe the surface of the part, even though the data was acquired with the part in different poses. Overlap of the individual data sets (or point clouds) is expected and acceptable, as long as there is no residual offset between the data sets and all the points are accurately projected into a single coordinate frame.

Note that the part can have its own coordinate frame not aligned with $\Phi_\theta$. For instance, a CAD model describing the geometry of the part would likely be referenced to some fiducial features on the part, such as three planes describing a corner. If the part is mounted in a tipped state on the Rotary stage, the part frame will not align with the $\Phi_\theta$ but will be related by a coordinate frame transformation. The coordinate frame of a part will be referred to as $\Phi_{PART}$. In the case where the part is a reference monument, then the coordinate frame of the part will be referred to as $\Phi_M$.

Coordinate transformation mathematics in general is widely discussed in previous literature, a lesson in such is not included here. However, a few key concepts are important to review in detail. Each point we discuss can be represented by a vector with a [X, Y, Z] value as shown in Equation 1. This disclosure is mostly interested in Rigid Body coordinate transformations, defined as those spatial manipulations a rigid body could experience. They have two components, a pure rotation part and a pure translation part. Rotational transformations can be expressed in the form of 3×3 matrices. When a data point in one frame is multiplied by a rotation matrix, the location of the point specified in a new frame rotated around the origin of the original frame is achieved. Translation transformations can be expressed in the form of 3×1 vectors. When a translation vector is added to a data point in one frame, the location of the point specified in a new frame shifted from the original frame is achieved. The use of both rotation and translations can be expressed in the same equation, as shown in Equation 1 where R is the rotation matrix and T is the translation vector.

$$\begin{bmatrix} x \\ y \\ z \end{bmatrix}_1 = [R]\begin{bmatrix} x \\ y \\ z \end{bmatrix}_0 + [T] = \begin{bmatrix} a & b & c \\ d & e & f \\ g & h & i \end{bmatrix}\begin{bmatrix} x \\ y \\ z \end{bmatrix}_0 + \begin{bmatrix} t_x \\ t_y \\ t_z \end{bmatrix} \quad \text{Equation 1.}$$

Pure rotation matrices are always orthonormal, meaning they have the special property that their inverse is identical to their transpose. Other types of point manipulation can be expressed in matrix form, including scaling, reflection and perspective operations. These are operations a rigid body could not experience and their matrix representations are not orthonormal. Rotation and translation operations can be expressed simultaneously in a single 4×4 matrix shown in Equation 2, know as a homogeneous coordinate system.

$$\begin{bmatrix} x \\ y \\ z \\ 1 \end{bmatrix}_1 = [H]\begin{bmatrix} x \\ y \\ z \\ 1 \end{bmatrix}_0 = \begin{bmatrix} a & b & c & t_x \\ d & e & f & t_y \\ g & h & i & t_z \\ 0 & 0 & 0 & 1 \end{bmatrix}\begin{bmatrix} x \\ y \\ z \\ 1 \end{bmatrix}_0 \quad \text{Equation 2.}$$

Note that a data point is now represented as a 4×1 vector. The homogeneous form in Equation 2 is mathematically equivalent to the rotation followed by a translation shown Equation 1. A homogeneous matrix that represents a rigid body transformation will have zeros in the locations specified in Equation 2 and the 3×3 sub-matrix identified by elements a–i will be orthonormal. Both rotation+translation as well as homogeneous representations are used in this disclosure. Even though the homogeneous representation is more compact and easier to manipulate, the calibration and alignment algorithms require the rotation and translation be handled separately. Note that the H transformation in Equation 2 is the form of the Ψ transformations we are seeking. Desired Calibration Technique Specifications: The desired specifications for a preferred embodiment of the 3D calibration technique of the present invention (which are deceptively simple while the implementation of them is not) are listed as follow:

The technique should preferably be able to determine the transformation $\Psi_{S2X}$ to project $\Phi_S$ to $\Phi_X$.

The technique should preferably be able to determine the transformation $\Psi_{X2\theta}$ to project $\Phi_X$ to $\Phi_\theta$.

The technique should preferably produce only rigid body transformation results, without perspective, reflection, or non-symmetric axis scaling.

The technique should not rely on precision alignment of the components and their relative coordinate frames. Although precisely aligned components would justify assumption that the rotation and/or translation transformations are null, such alignments will not stand over time and are not easy to support once the instrument is deployed in the field.

The technique should not rely on precision external measurements, such as calipers, to obtain transformation values. These can be used to attempt to verify the accuracy of a calibration but are not reliable enough and are not easily automated.

The technique should preferably be a process that can be automated, e.g. can determine the various required transformations without the operator doing more that setting up and invoking the process.

The technique should preferably be able to produce a calibrated $\Psi_{S2X}$ transformation with enough accuracy so that a Laser Scanner with an approximately 6" stand off and an approximately 12" deep×60° wide field of view, used in a configuration similar to that in FIG. 1, will generate less than about 0.001" of point to surface error due to deformations of the data set.

The technique should preferably be able to produce a calibrated $\Psi_{X2\theta}$ transformation with enough accuracy so that a Laser Scanner with an approximately 6" stand off and an approximately 12" deep×60° wide field of view, used as in FIG. 1 to acquire part data from multiple viewing angles, will generate less than about 0.001" point to surface error due to misalignment of the coordinate frames.

An important technique desired by the present invention is a method for aligning a pair of three-dimensional data sets. Different algorithms have been useful for aligning different kinds of data. Here we are most interested in a technique known as the Iterative Closest Point (ICP) algorithm. Of specific interest is how the ICP algorithm accomplishes the task of finding the rigid body transformation that will align two sets of three-dimensional data once a point-by-point correspondence has been established. A related task of interest is how a similar alignment can be accomplished starting with a single set of three-dimensional data and a three-dimensional description of a surface. Some of the key concepts useful in understanding how ICP functions are:

Correspondence: ICP works on two point sets of identical size. There must be a point-by-point correspondence between the two data sets. If a data set of N points was transformed using Equation 1 or Equation 2, a new point set with perfect correspondence to the original set would be generated. Each point in the new set has a corresponding point in the original set and a single rigid body transformation will bring the two data sets into perfect alignment, with the sum of all residual distances equal to zero.

Mean Centering: ICP determines the best rigid body transformation to minimize the RMS error between two corresponding data sets. The first step in this process is to center each data set so its centroid is located at the origin of the coordinate frame. This is accomplished by calculating the centroid of each data and subtracting it from each point in that data set. The result is a data set that has been "centered" to around the "mean" location in that set. The values used for this centering have another important use described later.

SVD Alignment: Once a set of corresponding data sets have been mean centered, the rotational transformation that yields the minimum RMS residual error between the data sets can be calculated. Of particular interest is how the Singular Value Decomposition (SVD) algorithm is utilized to determine this rotation transformation. First, a 3×3 covariance matrix is computed by multiplying the first data set by the transpose of the second. The SVD is computed on the covariance matrix, resulting in two orthonormal matrices related to the eigenvectors of the original matrix and a diagonal matrix with values related to the eigenvalues of the original matrix. A rotation matrix is then computed from the orthonormal matrices. Using the two centers determined during mean centering and the rotation matrix, a rigid body transformation in the form of Equation 1 can be derived and used to align the two corresponding data sets.

Iteration: The preceding explanation describes aligning two corresponding data sets and does not require any of the iterating that gives ICP part of its name. ICP techniques are typically run on dense data sets where a subset of one full set is chosen to drive the alignment. The challenge then becomes selecting the correct corresponding subset of points from the second set. The ICP algorithm addresses this challenge by allowing the selection of an imperfect subset of corresponding points. The alignment is calculated and applied to one of the data sets, resulting in a closer alignment that is not usually perfect. The process of selecting a new corresponding subset of points from the second set is repeated, along with the alignment and transformation steps. In this fashion, the alignment between the two data sets is refined, until a termination criterion is reached.

There are countless published variations of strategies in how the subsets of corresponding data are chosen. One in particular, so called "normal shooting" relates to a preferred embodiment of the present invention. In this strategy, a plane is fit to the a small group of points in the second data set that are determined to be near a sample point in the first data set. If the plane fits the group well enough to accurately describe their location relative to each other, then a normal to that plane is "shot" through the sample point from the first data set. The point where this normal intersects the plane is determined to be the corresponding point in the second data set to match the sample point in the first data set. If the plane didn't describe the small group of points, another sample point is chosen and the process repeats until the desired number of corresponding points have been obtained from both data sets to conduct the alignment step. This same approach would also work in situations where, instead of two point clouds, one point cloud and a description of a surface are to be aligned. In that case, the process for choosing corresponding points would be similar but instead of shooting normals from planes fit to points, the normals would be shot from the various sub-surfaces and the shortest normal would be used to generate the point corresponding to the sample point.

Features of the 3D Calibration: The capabilities of known ICP algorithms were intriguing but did not provide solutions to match the desired specifications for a preferred embodiment of the 3D calibration technique of the present invention. As part of the calibration technique, we were forced to invent a new nested iterative alignment algorithm capable of aligning two coordinate frames simultaneously. This is one of the many unique contributions of this calibration technique. Other unique features include, but are not limited to:

- We decided to utilize the concept of aligning a point cloud to the description of a surface.
- We decided to scan an artifact with well known and substantially accurate surface description, denoted as "the monument", to generate the point set used in the alignment process.
- We wanted a monument that could be substantially accurately described entirely by substantially triangular facets. These are easy to construct, easy to measure to verify geometry and easy to describe mathematically.
- After studying a preferred monument shape, we generated a unique class of monument forms that provide superior alignment performance with a preferred embodiment of the 3D calibration technique. These monuments also contain unique features that make them preferable for verifying the performance of the complete scanner system.
- By placing the monument almost anywhere in the field of view of the scanner, an automatic routine can be invoked to scan the monument and generate a highly accurate $\Psi_{S2X}$ transformation.
- By placing the monument on the rotary stage and scanning at two (or optionally more as desired) rotary positions, an automatic routine allows both the $\Psi_{S2X}$ transformation and the $\Psi_{X2\theta}$ transformation to be substantially simultaneously determined.
- The technique also allows the pose of the monument or other similar objects to be automatically determined in $\Phi_X$ or $\Phi_\theta$.

Disclosure Format: The algorithm(s) for conducting a preferred embodiment of the 3D calibration technique of the present invention are disclosed in detail in Tables 1 and 2. These algorithms have been prototyped in the interpretive mathematics environment Mathcad (Mathcad 2001 Professional, MathSoft Inc. 101 Main St. Cambridge, Mass. 02142). Mathcad documents have the significant advantage that the mathematics is presented in a notionally correct graphical format that is easy to read and readily understandable. Since no complier is involved, a novice could recreate the entire algorithm by transcribing them directly into Mathcad. As such, these documents are essentially self-documenting in a fashion that could never be obtained with C code. In addition to benign formatting, Tables 1 and 2 have also been heavily commented to further aide in understanding the algorithm.

The only slight drawback to this form of algorithm disclosure is that the Mathcad sheets were specifically developed to aid in the development and testing of the algorithm. As such, they contain places where the diagnostics and function definitions seem to serve little purpose. Therefore, the following description of the algorithms will serve as a guide to the appropriate sections of the algorithm and deal with the more relevant concepts developed and implemented, avoiding the mathematical details wherever possible.

XICP Algorithm: Table 1 contains the algorithm denoted in entirety as "XICP". This algorithm requires as input a data set of points measured from the surface of the monument, an accurate surface description of the monument and a calibration file from the scanner. The output is a $\Psi_{S2X}$ transformation matrix and a $\Psi_{X2M}$ transformation matrix, as well as a host of diagnostics. The details follow.

Points: The points are given as a hybrid tuple of $[x_X, y_S, z_S]$ where the x value comes from the position of the X stage when the y and z values were acquired from the scanners measurement of the monument surface. Note that x is in $\Phi_X$ while (y, z) is in $\Phi_S$. The actual data shown throughout Table 1 is simulated data that was generated from the surface definition of the monument. As such, it contains no measurement noise. Therefore, its final alignment with the monument surface is limited only by numerical precision and any termination criteria. Since the data is simulated, the exact $\Psi_{S2X}$ and $\Psi_{X2M}$ transformations used to create the data set are known, so the efficacy of the algorithm at recovering these values can be investigated. The data is read into the algorithm in the section 0H.

Monument: The surface of the monument is described by a list of triangular facets. Each facet is described by its three corner points. The monument definition file has two kinds of entries. The first is an indexed list of points that form vertices of triangles. The second is an indexed list of facets and which points contribute to each facet. The monument file is read into the algorithm in section 1A. Since the monument surface is specified only by a list of points in a specific order, the monument definition can also be transformed by rigid body transformations, such as Mean Centering, without affecting the accuracy of the surface description. The triangular facets are converted to a parametric representation in section 1E and are dealt with in that fashion throughout the algorithm.

Calibration File: The calibration file is read into the algorithm in section 0I. Examination will show the value have all been set to 0 because the so called "Planar Comp" was not used when generating the simulated data. However, in a real scanner used in a preferred embodiment of this invention, a "planar compensation surface" is a requirement to maintain high precision. The scanner sweeps the laser beam across the field of view preferably utilizing a rotating polygon mirror. The sweep is typically close to but not precisely described by a plane. A calibration polynomial is used to describe the shape of the path swept out by the laser. The resulting corrected point location in $\Phi_S$ is a tuple given by $[\Delta x(y, z), y, z]$. Since $\Delta x$ is a function of $(y, z)$ it need not be passed into the algorithm along with the $[x_S, y_S, z_S]$ tuple as it can be calculated when needed using the polynomial coefficients. Accommodating this correction factor complicates the entire algorithm simulation process and although it is often left out in the simulated data, it is dealt with rigorously in the XICP algorithm.

Simulated Data: In the simulated example in Table 1, the scanner has recorded surface data locations from the facets of the precision monument. The ($\Phi_S$ is transformed away from $\Phi_X$ by $-1.18532°$ around the Z-axis and $4.03747°$ around the Y-axis. Therefore, the data from the monument will appear sheared. Additionally, the pose of the monument is not orthogonal to $\Phi_X$, but is off by $-5.00847°$ around Z, $0.92235°$ around Y and $4.81052°$ around X. The function that does all the iterative manipulation of the data to compare it to the monument surface can be found in section XX. For whimsical reasons, this algorithm is called "Ballet" because it repeatedly moves the data back and forth between the coordinate frames.

Rough Alignment: The first two lines of Ballet load the data set into temporary buffers. Several sets of data are created from the original data set, understanding their purpose is import in understanding the functioning of the algorithm. There is the initial hybrid data set "Data". Then there is "SKEW_Data" which is a copy of the original data points that are in $\Phi_X$ and are iteratively corrected by the progressively better values of $\Psi_{S2X}$. There is also "TEMP_Data" which are the iterative corrected values of "SKEW_Data" that are projected into the frame of the monument, $\Phi_M$, using progressively refined values for $\Psi_{X2M}$. Of course, initially we have no idea of $\Psi_{S2X}$ or $\Psi_{X2M}$ so all three sets start identical. It is very important to note that each time a more refined value of $\Psi_{S2X}$ or $\Psi_{X2M}$ is determined they are applied to the original "Data" to get "SKEW_Data" and "TEMP_Data". If we modified the values of "SKEW_Data" and "TEMP_Data" by incrementally adjusting them with each pass of the algorithm, we would obtain refined and accurate values of points on the monument surface in both $\Phi_X$ and $\Phi_M$, but would have lost track of how we got there. By always creating "SKEW_Data" and "TEMP_Data" directly from the original "Data" we ensure we obtain the desired values of $\Psi_{S2X}$ and $\Psi_{X2M}$. Note that "Data", "SKEW_Data" and "TEMP_Data" are kept the same length so that all corresponding copies of a point have the same index value.

The $3^{rd}$ line mean centers the data if desired, refer to section 0B. It is usually recommended to mean center the data and the monument as a first step, in this example the monument definition was already centered. The XICP algorithm as disclosed here is intended as a final alignment technique for data sets that start somewhat aligned with the monument, for example $+/-30°$ and $+/-15"$. Greater initial misalignments must be handled with an initial annealing step, known in the art but not discussed here.

The $4^{th}$ line initializes a series of variables to 0. The $5^{th}$ line sets a flag that will instruct the algorithm to conduct an initial alignment before trying to simultaneously determine $\Psi_{S2X}$ and $\Psi_{X2M}$. The $7^{th}$ line graphically defines an outer loop that will run 101 time or until halted. This detailed simultaneous determination loop does not start until a rough alignment is completed. Evaluation falls to the $23^{rd}$ line where the inner, rough alignment loop runs an arbitrary number of times, in this case 21 times or until sufficient alignment convergence is obtained.

The inner loop is implementing an iterative loop similar in some aspects the normal shoot to a surface described previously. An important aspect of the inner loop is which data set it is working on and how it shares them with the outer loop.

Each $m^{th}$ point of the "TEMP_Data" points in $\Phi_M$ are shot against each facet in the monument in the $29^{th}$ line and either the closest facet or a list of identically close facets is returned. The facet or list of facets is evaluated to find if the projected point on the surface of the closest facet is inside the boundaries of the facet. If the projected point is inside the boundaries of the facet, it is now accepted as a control point with correspondence to the $m^{th}$ original data point. Copies of the $m^{th}$ data point from "Data" and "SKEW_Data" as well as the new $m^{th}$ control point are put into temporary buffers denoted as "SUB_Data", "SUB_SKEW_Data" and "SUB_Control" respectively.

When all the valid points and corresponding control points have been accumulated, mean centering and SVD alignment are conducted in lines 40, 41, and 42 to align the "SUB_SKEW_Data" with the "SUB_Control" data. In this fashion, a progressively refined value of $\Psi_{X2M}$ is determined using a progressively refined copy of the original data in $\Phi_X$. In the initial 21 rough alignment passes, there is no difference between "Data" and "SKEW_Data", so the alignment accomplishment are limited to moving the sheared original hybrid data closer to the monument, the shear effects cannot yet be addressed. The new values of $\Psi_{X2M}$ just determined is applied to both "SKEW_Data" to generate a refined copy of the "TEMP_Data" set that is closer to the monument.

In line 44, the new values of $\Psi_{X2M}$ are also applied to "SUB_SKEW_Data" to move that data subset closer to the monument. This new "TEMP_SUB_Data" is then compared with "SUB_Control" data and the RMS distance between the two sets is calculated as a performance metric. The inner loop will run 21 times or it will break if the RMS values of 3 successive passes within a tolerance value of each other. In the example in Table 1, the tolerance is set to 0.0000001. For reference, the top portion of the "RMS Dist. Error V. Iteration Pass" plot shows the progress of the rough alignment phase. The RMS went from about 0.10" inches to 0.01" inches in 20 steps. It appears the rough pass alignment terminated because it had bottomed out.

Simultaneous Alignment: Once the successive rough alignment passes terminates, the whimsically named "PingPong" flag is set and from now on the algorithm will take a single step of refining $\Psi_{S2X}$ (outer loop) followed by a single step of $\Psi_{X2M}$ (inner loop) until 101 passes have been taken or the algorithm bottoms out and terminates. Starting again at line 9, a series of data manipulation steps are conducted on the corresponding "SUB_Data" and "SUB_Control" data sets determined on the last pass through the inner X2M loop. First, the inverse of the most refined values of $\Psi_{X2M}$ are applied to the "SUB_Control" data set to project it into $\Phi_X$ using the whimsically named "Tango" function, reference section 6F. Now that both the control and original data sets are in $\Phi_X$, the values for $\Psi_{S2X}$ can start to be refined.

A fundamental observation that makes the refinement of $\Psi_{S2X}$ possible is that the shear in the hybrid monument scan data can be corrected by a rigid body transformation if the $(y_S, z_S)$ points are transformed by $\Psi_{S2X}$ before the data is translated by the $x_X$ term. After the 3D hybrid data is formed, a rigid body transformation cannot repair the sheared data set. The technique developed to take advantage of this discovery is to remove (subtract) the point-by-point $x_X$ term present in the "SUB_Data" set from both the "SUB_Data"

and "SUB_Control" data sets. When planar compensation data is not present in the data set (as when the data is simulated) then this "collapsing" step will yield a perfectly planar "SUB_Data" set denoted "COMP_X_SUB_Data". The corresponding "COMP_X_SUB_Control" data set will have residual X values that are due to the $\Psi_{S2X}$ terms. The now familiar mean centering and SVD alignment step can be conducted on these two compressed data sets to generate a refined set of values for the $\Psi_{S2X}$ transformation.

The data collapsing steps take place on lines 11 and 12. Referring to the two enabled Compress$_{Data}$ and Compress$_{Control}$ in section 6C, we can see the functions allow for the presence of a planar compensation surface in the form of an inclined plane. After the point-by-point $x_X$ term has been removed from both data sets, the $\Delta x_S$ term is carefully added back in.

After the refined values of $\Psi_{S2X}$ have been determined, we can see that line 19 null out the rotation component about the X-axis. This term does not contribute to the shear of the hybrid data set in the preferred embodiment. Further, the rotation about the X-axis terms were observed to compete with the $\Psi_{X2M}$ transformation values. Therefore, it is suppressed on each pass through the outer loop. The new, refined values for $\Psi_{S2X}$ are now applied to the original data set "Data" to create the progressively refined "SKEW_Data" set in $\Phi_X$. The "SKEW_Data" set is created on line 20 using a function in section 6B that very carefully removes the $x_X$ values from the original hybrid data set, leaving any $\Delta x_S$ terms. The $\Psi_{S2X}$ transformation is then applied and the $x_X$ data is added back to the data. The "SKEW_Data" is then moved back into $\Phi_M$ to generate the progressively refined "TEMP_Data" set, which is used in the next pass through the inner X2M loop.

The double alignment loop works to align the data to the monument in $\Phi_M$, then moves all the data back into $\Phi_X$, collapses the data and works to align to the collapsed monument. By always applying the refined $\Psi_{S2X}$ and $\Psi_{X2M}$ to the original data set and iterating to refine each transformation in turn, the XICP algorithm can simultaneously achieve optimized values of both from a single data set in an automatic fashion. The dark lower line in the "RMS Dist. Error V. Iteration Pass" plot shows the XICP algorithm was able to refine the RMS distance errors between the simulated data set and the monument surface to better than one part in a millionth of an inch. All the angular components in $\Psi_{X2M}$ were recovered to better than 0.00003°. The angular components in $\Psi_{S2X}$ were also recovered to within 0.00003°.

There are several strategies employed to optimize the speed and efficacy of the XICP routine. One is shown in section 3H where points too close to the edge of triangle can be rejected and not included in the control data set. Another technique, not shown in Table 1, is where a small percentage of the entire data points are utilized during the initial rough alignment and simultaneous optimization. After a certain tolerance level of RMS error has been obtained, the data can be resampled to optimize a larger data set. This speeds up the algorithm by reducing the number of comparison steps to be accomplished, yet still forces a highly accurate result.

Finding $\Psi_{X2\theta}$: The XICP algorithm in Table 1 provides refined values for $\Psi_{S2X}$ and $\Psi_{X2M}$ by matching a single scan of the monument to its surface definition. The $\Psi_{S2X}$ transformation can be used to transform the Scanner data to align with the X-axis in $\Phi_X$ before it is combined with the position values from the X stage. In this fashion, calibrated data in $\Phi_X$ is obtained from the Scanner+X stage combination. It is worth noting that the monument can be placed anywhere in the field of view of the scanner to achieve good results using XICP. This 3D calibration technique can be used on a system similar to that shown in FIG. 1, with or without the rotary stage. However, if a rotary stage is to be used, it is very desirable to have refined values of $\Psi_{X2\theta}$ so individual scans can be projected into $\Phi_\theta$, enabling automatic, seamless knitting of data from multiple scans at different rotary positions.

Using Two Poses: By rigidly mounting the monument on the rotary stage and scanning it in several different poses, the XICP algorithm will provide a $\Psi_{X2M}$ for each pose. Since the monument was rigidly affixed to the rotary stage, these different values of $\Psi_{X2M}$ are related by a pure rotary translation about the X-axis in $\Phi_\theta$. Table 2 contains a Mathcad sheet that specifies two different algorithms that may be used to find the value of $\Psi_{X2\theta}$. The preferred, "RotCenterFromFrames" in section 1D, utilizes the $\Psi_{X2M}$ transformations from XICP analysis from two different poses of the monument rigidly affixed to the rotary stage.

"RotCenterFromFrames" takes as arguments the inverses of the two $\Psi_{X2M}$ transformation matrices, making them $\Psi_{M2X}$ transformations. It then defines two entirely arbitrary points (p1, p2) in $\Phi_M$. In the definition in Table 2, points 500 inches out on the Y and Z axes were defined. These points are then transformed back into $\Phi_X$ using the two $\Psi_{M2X}$ transformations values, resulting in two sets of two points (Pa$_1$, Pa$_2$), (Pb$_1$, Pb$_2$) related by a pure rotation about the X axis in $\Phi_\theta$.

The bisector (Bs$_1$) of the line connecting the two corresponding instances of the first point (Pa$_1$, Pb$_1$) is computed, as is the bisector (BS$_2$) of the corresponding line connecting the instances of the second point (Pa$_2$, Pb$_2$). Next, the vector connecting (Pa$_1$, Pb$_1$) is computed (V$_1$) and that for (Pa$_2$, Pb$_2$), yielding (V$_2$). A third vector (V$_r$) is computed by taking the cross product of V$_1$ and V$_2$. The vector V$_r$ is parallel to the X axis of the rotary table.

It remains to find a point corresponding to the origin of $\Phi_\theta$ that lies along the axis V$_r$. Recall that the intersection of three non-parallel planes forms a point. One form of mathematically specifying a plane requires a normal vector and a planar offset value. One plane can be defined using V$_1$ as the normal vector and the value for the planar offset can be found by taking the dot product of V$_1$ with its bisector Bs$_1$. A second plane can be found using V$_2$ and the dot product of V$_2$ and Bs$_2$. Note that the intersection of these two planes is identical to the axial vector V$_r$. The third plane required to find an origin of $\Phi_\theta$ can be found using V$_r$ as the normal vector and picking an arbitrary point on the third plane to specify the planar offset value. In the example in Table 2, the point where V$_r$ crosses the YZ plane in $\Phi_X$ was chosen. Given 3 equations of planes with forms similar to ax+by+cz=d, a matrix operation can be conducted to yield the values of (x, y, z) that correspond to the intersection of the three planes and also specify the origin we are seeking. Therefore, the return from the function "RotCenterFromFrames" is an origin point and the axis of the rotary stage given in $\Phi_X$.

A function "AlignAxes" in section 1E is used to specify the $\Psi_{X2\theta}$ transformation. For input, it takes the output "RotCenterFromFrames" as well as the value of the origin in $\Phi_\theta$(0,0,0) as well as the specification of the axis to align to [1, 0, 0]. The result is the $\Psi_{X2\theta}$ transformation that accurately maps the data from $\Phi_X$ to $\Phi_\theta$.

Using Three Poses: Another useful algorithm for finding $\Psi_{X2\theta}$ is in section 1B. "RotationCenter" requires $\Psi_{M2X}$ from three different poses of the monument on the rotary table. A single arbitrary point (p) in $\Phi_M$ is projected into $\Phi_X$ using the three $\Psi_{M2X}$ transformations, yielding three instances of the same point, (p$_1$, p$_2$, p$_3$). These points are all related by a pure rotation about the X-axis in $\Phi_\theta$. To find the axis and origin, a similar strategy to the Two Pose case above is employed. Two vectors and their bisectors are defined. A third vector orthogonal to the first two vectors is defined using a cross product. This new vector is parallel to the X-axis of the rotary stage.

To find the origin, three planes are defined. The first two are specified by taking the first two vectors and the dot product of the vectors with their bisectors. The third plane can be defined using the orthogonal vector and an arbitrary point. Preferably, the third plane can be chosen where the orthogonal vector crosses the Y, Z plane in $\Phi_X$ by setting the planar offset value to 0. The origin of the rotary frame can now be specified by the intersection of the three planes using the same reduction technique discussed in the Two Pose section. The return from "RotationCenter" is the origin point and the axis of the rotary stage given in $\Phi_X$. The function "AlignAxes" can then be used to specify the $\Psi_{X2\theta}$ transformation that accurately maps the data from $\Phi_X$ to $\Phi_\theta$.

Monument Shapes and Definitions: The preceding sections have referred to a preferred optimal monument design. Simulated data from a version of an optimal monument was included in Table 1. Here, we discuss the features and constraints of monument design that simultaneously make them useful in calibration 3D laser scanner system using the XICP algorithm and aid in the traceable verification of the scanner performance. A list of desirable qualities in a precision monument used in conjunction with the XICP algorithm to calibrate a laser scanner system similar to that shown in FIG. 1 includes, but is not limited to:

- A preferred monument should preferably be constructed from a rigid, stable material such as a ceramic so that the precision of the features do not change over time and with environmental changes.
- The precision reference surfaces should preferably all be described using substantially triangular facets. The monument may have non-precision surfaces in locations not intended for scanning, such as the back side of the monument or in the location of any mounting holes.
- The non-precision surfaces will not affect the 3D calibration algorithms if they are not represented in the surface description of the monument, e.g. if a sparse surface representation is utilized. An example of a sparse surface representation can be found in Table 1, section 1G, where the pyramid features are depicted without any supporting structure around them.
- The monument structure should preferably have features that exhibit significant slope changes. The idea here is that during alignment, a point moving off the intended facet should encounter an abrupt increase in distance penalty the farther it is misaligned from the ideal position. Therefore, gentle slope changes and small feature sizes should be avoided.
- The monument structure should preferably have variations in all directions. For example, the pyramid monument in Table 1, section 1G has variations in the X, Y and Z directions. Long "ridges" instead of separate pyramids would make it hard for the XICP algorithm to correctly align because shifting along the long axis of the ridges would be hard to detect.
- A preferred key feature of a successful monument is a structure that has approximately 25% of the reference surfaces sharing a common extended plane. The reference surfaces are the precision surfaces that are represented in the surface definition file. These surfaces do not need to be contiguous. This amount of common plane area has the effect of forcing the XICP algorithm to keep the alignment of the point cloud engaged against the extended flat surfaces of the monument. Therefore, the rest of the alignment can be approximated as lateral motion along the extended plane and rotation around a normal to the extended plane. These constraints are similar to those obtained using a standard 1 2 3 alignment technique. Aligning against a monument such as the pyramid monument in Table 1, section 1G without any extended planar sections defined can let a slightly rotated alignment "hover" above the surface of the monument in order to minimize distance errors. Such alignments are not as accurate as those conducted on monuments with the extended plane. Empirical evidence suggests that the optimal range of the ratio of extended flat area to the total projected area of the reference surfaces is between about 15% and about 50%.
- A monument should be large enough to span at least about 50% of the field of view of the scanner. A tiny monument in a large field of view will not have the leverage to ensure angular accuracy of the alignment sufficient to avoid measurement errors at the edge of the field of view.
- For a monument to be useful as a tool used in both calibrating and certifying the performance of a scanner system, it preferably should have regular features that are easy to manufacture and to certify. Planar facets at angles of 90° and 45° are preferable from a manufacturing and verification standpoint. Modified pyramid structures such as those in FIGS. 2a–2e and FIGS. 3a–3e are preferable.
- The use of structures related to pyramids allows the monument to contain integral step gauges. Examination of FIGS. 3a–3e shows that the monument was designed such that in all directions, the step distance of each face is exactly 2.000" from a neighbor pyramid face. This allows the monument to be scanned in a wide range of orientations in the field of view and the geometry of the resulting scans can be easily checked using standard point to plane and plane to plane verification fitting routines.
- A very useful feature of a monument is if it contains implicit points that can be verified through certification and found via scanning. An example of an implicit point is the center of a sphere. The center can be found via fitting a sphere to either scan data or verification CMM data. However, spheres are not a preferred monument feature when using laser scanners. We prefer to utilize implicit points defined by the intersection of three planes. In the truncated pyramid structures in FIGS. 2a–2e, each pyramid has four implicit points (i.e. on the corners of the square at the top of each pyramid) that can be both scanned and verified with a CMM. The monument can be scanned in many different poses in the field of view of the scanner. The accuracy of the scanner can be verified by analyzing the step features inherent in the planes and by deriving the relative position of all the implicit points and comparing against the traceable certification of the monument.

Mayan Monument Example: With the exception of one dimension, the monument depicted in FIGS. 2a–2e is a preferred monument design for 3D calibration with the XICP algorithm and for use in scanner verification. It's advantages and features include, but are not limited to:

- It is made, for example, of a rigid, stable, opaque ceramic.
- It is large enough to span about 50% of the field of view of the laser scanner system in FIG. 1.
- The truncated pyramids have a preferred variation in all directions with large changes in surface normal at the interfaces between faces.
- All the flat surfaces may preferably be described by triangular facets.

The manufacturing (and preferably the entire manufacturing) is preferably done at 90° and 45°.

The surface description of the monument preferably only includes the sides and tops of the pyramids. The large flat between the pyramids, mounting holes and small stand-off are not included. Therefore, the large flat need not be ground and lapped to precision, thereby reducing monument cost.

The shape is preferable for precision manufacturing and traceable verification.

The square flats represent substantially 25% of the total projected area of the reference faces.

The steps between the neighboring pyramid faces are, for example, substantially 4.9497", an exemplary spacing of substantially 5.0000" would be preferable.

There are 4 implicit points on the corners of the 2" square at the top of each pyramid.

Six Point Pyramid Monument Example: The monument depicted in FIGS. 3a–3e is also a very useful monument design for calibrating a 3D laser scanner using XICP and for verifying scanner performance. It's advantages and features include, but are not limited to:

The reference surfaces are the faces of the 6 pyramids and a portion of the flat section in the long valley between the rows of 3 pyramids.

The reference surfaces may preferably all be described by triangular facets.

All construction is preferably done at 90° and 45°.

The monument has enough variation in all directions to be preferable for use with XICP alignment.

The faces all have significantly different surface normals than their neighbors.

All the facets have a 2.000" step gauge relationship with neighboring pyramids.

The ends of the monument preferably have precision 0.002", 0.004" and 0.008" height gauge features for investigating the scanner resolution.

The square post legs in the corners simultaneously provide support legs for standing the monument on any side face, they act as standoffs to protect the pyramids, and they also form 6.000" step gauges from face to face in one direction and 10.500" step gauges in the other direction.

One slight drawback with the specific implementation in FIGS. 3a–3e is the monument would preferably be larger than the Mayan configuration to better span the field of view of the scanner.

Alternate Implementations: There may be various modifications and variations to the concepts and implementations disclosed here (including the algorithms) that are within the scope of the present invention including, but not limited to:

The XICP algorithm is not limited to characterizing and calibrating only 2-axis motion systems. If a multiple axis motion system (e.g. (x,y) or (x,y,z,a,b,c)) is pre-compensated, such as a CMM, then by aligning with one axis of motion, the scanner can be aligned with the whole motion system.

If the multiple axis motion system is not pre-compensated, then by aligning the scanner with one axis of motion at a time, the scanner, XICP algorithm and monument can be used to develop the compensation mapping to relate all the axes of motion into a common, compensated coordinate frame.

The motion system does not have to be configured like the system shown in FIG. 1. For example, the motion axis could be horizontal, or two crossed axes of motion could be used instead. Further, two orthogonal rotary stages could be used in place of the single rotary stage shown in FIG. 1. Finally, the scanner could be connected to a six axis CMM machine.

Multiple scan heads can be calibrated simultaneously using XICP and at least one monument. For example, if the system in FIG. 1 had two scan heads, both simultaneously measuring item(s) on the rotary stage, then using the monument(s) and XICP on the individual scan data, both scan heads could be automatically aligned with $\Phi_\theta$. Therefore, both scanners would be reporting data in the same coordinate frame, creating seamless data automatically with no need for post process alignment steps.

The monument shapes are not limited to planar facets or those described by triangular facets. Curves, spheres and arbitrary shaped surfaces could alternatively be used if other surface specifications were used, including but not limited to STL, IGES, STEP and SAT (well known surface description formats).

The monument can have lots of detail in addition to the triangular facets defined in the surface definition. Such detail can be useful in constructing or mounting the monument.

The monument can also have detail used for verification that is not used in the calibration step by simply not including the other feature's calibration surface description or by placing the details on a face of the monument not scanned during calibration.

The XICP algorithm can be sped up by performing a spatial sort on the facets including, but not limited to, a KD tree or its related partitioning systems. These partitions would allow far fewer facets to be tested with the normal shoot to find the control points, possibly providing significant speed increases.

Once a monument has been aligned to a scanner using XICP, its implicit points can be found. XICP can be used to find the relationship between two poses of the monument by aligning its implicit points. Table 2 can be modified to work on the implicit point data instead of the arbitrary points in order to find the center and axis of rotation of the rotary stage.

The monument is not limited to 4 sides. It may, for example, comprise 3 or more than 4 as desired. The faces of the features are not limited to 45° and 90° for a monument having any number of sides.

The rotary table may be replaced by a linear table of the type, e.g., in FIG. 1. In such a case, Table 2 should be modified to find the new coordinate frame of the linear table. This configuration would fall within the scope of the present invention.

The scanner could be mounted directly on a rotary stage in order to change the orientation of the field of view between scans. The calibration would fall within the scope of the present invention.

Those of ordinary skill in the art will recognize that various modifications and variations may be made to the embodiments described above without departing from the spirit and scope of the present invention. For example, the preceding techniques do not have to be implemented alone, they can be combined to produce hybrid techniques that might fit a specific application better than a single technique. It is therefore to be understood that the present invention is not limited to the particular embodiments disclosed above, but it is intended to cover such modifications and variations as defined by the following claims.

Table 1

Table 1 contains the algorithm denoted in entirety as "XICP". This algorithm requires as input a data set of points measured from the surface of the monument, an accurate surface description of the monument and a calibration file from the scanner. The output is a Ysx transformation matrix and a Txm transformation matrix, as well as a host of diagnostics.

---

XICP Cal F.mcd

Future 3D Cal Simulation based on Future Cal Q.mcd

0A: Define some 3D Transforms

Non-homogeneous individual rotations and translations $$R_z(\theta) := \begin{pmatrix} \cos(\theta) & \sin(\theta) & 0 \\ -\sin(\theta) & \cos(\theta) & 0 \\ 0 & 0 & 1 \end{pmatrix} \quad R_y(\beta) := \begin{pmatrix} \cos(\beta) & 0 & -\sin(\beta) \\ 0 & 1 & 0 \\ \sin(\beta) & 0 & \cos(\beta) \end{pmatrix} \quad R_x(\gamma) := \begin{pmatrix} 1 & 0 & 0 \\ 0 & \cos(\gamma) & \sin(\gamma) \\ 0 & -\sin(\gamma) & \cos(\gamma) \end{pmatrix} \quad T(x, y, z) := \begin{pmatrix} x \\ y \\ z \end{pmatrix}$$

Non-homogeneous rotation matrix $$\Delta R(\theta, \beta, \gamma) := \begin{pmatrix} \cos(\theta)\cos(\beta) & \sin(\theta)\cos(\gamma) + \cos(\theta)\sin(\beta)\sin(\gamma) & \sin(\theta)\sin(\gamma) - \cos(\theta)\sin(\beta)\cos(\gamma) \\ -\sin(\theta)\cos(\beta) & \cos(\theta)\cos(\gamma) - \sin(\theta)\sin(\beta)\sin(\gamma) & \cos(\theta)\sin(\gamma) + \sin(\theta)\sin(\beta)\cos(\gamma) \\ \sin(\beta) & -\cos(\beta)\sin(\gamma) & \cos(\beta)\cos(\gamma) \end{pmatrix}$$

NOT USED: Homogeneous transformation matrix $$\Delta T(\theta, \beta, \gamma, x, y, z) := \begin{pmatrix} \cos(\theta)\cos(\beta) & \sin(\theta)\cos(\gamma) + \cos(\theta)\sin(\beta)\sin(\gamma) & \sin(\theta)\sin(\gamma) - \cos(\theta)\sin(\beta)\cos(\gamma) & x \\ -\sin(\theta)\cos(\beta) & \cos(\theta)\cos(\gamma) - \sin(\theta)\sin(\beta)\sin(\gamma) & \cos(\theta)\sin(\gamma) + \sin(\theta)\sin(\beta)\cos(\gamma) & y \\ \sin(\beta) & -\cos(\beta)\sin(\gamma) & \cos(\beta)\cos(\gamma) & z \\ 0 & 0 & 0 & 1 \end{pmatrix}$$

0B: A function to find the centroid of each cloud, another to subtract it from each cloud $$\text{Find}_{\text{Center}}(\text{Input}) := \begin{vmatrix} M \leftarrow \text{Input}^T \\ \text{for } k \in 0..2 \\ \quad N_k \leftarrow \text{mean}(M^{\langle k \rangle}) \\ N \end{vmatrix}$$

Find.Center wants only an array of points (in columns) and it will return a point that is the "center of mass"

$$\text{Center}(\text{Input}, \text{Center}) := \begin{vmatrix} M \leftarrow \text{Input}^T \\ \text{for } k \in 0..2 \\ \quad M^{\langle k \rangle} \leftarrow M^{\langle k \rangle} - \text{Center}_k \\ M^T \end{vmatrix}$$

Center wants both an array of points (in columns) and a single point at its center. It will return a new array centered around the Center point.

0C: Now create the, Find the Rotation using the SVD on the Covariance matrix

$$\text{Find}_{R2}(\text{Data}, \text{Control}) := \begin{vmatrix} M \leftarrow \text{Data} \cdot \text{Control}^T \\ N \leftarrow \text{svd}(M) \\ U \leftarrow \text{submatrix}(N, 0, 2, 0, 2) \\ V \leftarrow \text{submatrix}(N, 3, 5, 0, 2) \\ R \leftarrow V \cdot U^T \\ \text{if } |R| = -1 \\ \quad \begin{vmatrix} V^{(2)} \leftarrow -V^{(2)} \\ R \leftarrow V \cdot U^T \end{vmatrix} \\ R \end{vmatrix}$$

Creat the covariance matrix:
Find the left and right eigen vectors:
Split them out of Mathcads bizzare return
Define the rotation matrix and compare with the original transform matrix

0D: We can also back out the actual rotation angles from the rotation matrix

$$\text{Find}_{\text{Angles}}(\text{Input}) := \begin{pmatrix} -\text{asin}\left(\dfrac{\text{Input}_{1,0}}{\cos(\text{asin}(\text{Input}_{2,0}))}\right) \\ \text{asin}(\text{Input}_{2,0}) \\ \text{asin}\left(\dfrac{\text{Input}_{2,1}}{\cos(\text{asin}(\text{Input}_{2,0}))}\right) \end{pmatrix}$$

It is possible to recover individual rotation terms (angles) by taking apart the rotation matrix.

0E: Now we apply the rotation and fix the translation to move the Data to the Control

$$\text{Move}(\text{Data}, R, C_{\text{data}}, C_{\text{control}}) := \begin{vmatrix} \text{for } k \in 0 .. \text{cols}(\text{Data}) - 1 \\ \quad \begin{vmatrix} \text{Data}_R \leftarrow R \cdot \text{Data} \\ \text{Data}_{\text{Offset}}^{(k)} \leftarrow \text{Data}_R^{(k)} + (C_{\text{control}} - R \cdot C_{\text{data}}) \end{vmatrix} \\ \text{Data}_{\text{Offset}} \end{vmatrix}$$

Index variable to "active" columns of data
Un-apply the final transform to the data
This deals with the offsets in a column operation

0F: Needed function to find distance from point to point

$$D_{P2P}(\text{Pdata}, \text{Pcontrol}) := \begin{vmatrix} N \leftarrow M \leftarrow 0 \\ \text{for } i \in 0 .. \text{cols}(\text{Pdata}) - 1 \\ \quad N_i \leftarrow |\text{Pcontrol}^{(i)} - \text{Pdata}^{(i)}| \\ \text{mean}(N) \end{vmatrix}$$

This finds the distance from 1st point to 2nd point.

0G: Define a function to turn the Vertex Array into a Display Array

$$\text{Disp}(\text{Input}) := \begin{vmatrix} M \leftarrow \text{Input}^T \\ \begin{pmatrix} M^{(0)} \\ M^{(1)} \\ M^{(2)} \end{pmatrix} \end{vmatrix}$$

This is a bizarre function that takes a matrix of column vectors and puts them into a form that for some reason MathCad will plot, but only if there are two data sets... Useless except for the compact notation it allows

0H: Need a file read/parse function

$$\text{Read}(Name, mirror, Points) := \begin{vmatrix} Data \leftarrow \text{READPRN}(\text{concat}(\text{concat}(Name,"")))\\ j \leftarrow 0 \\ \text{for } i \in 0..\text{rows}(Data)-1 \\ \quad \text{if } Data_{i,6} = mirror \\ \quad \quad \begin{vmatrix} M_{j,0} \leftarrow Data_{i,0} \\ M_{j,1} \leftarrow Data_{i,1} \\ M_{j,2} \leftarrow Data_{i,2} \\ j \leftarrow j+1 \end{vmatrix} \\ N \leftarrow M^T \\ Skip \leftarrow \text{floor}\left(\frac{\text{cols}(N)-1}{Points}\right) \\ (Out \leftarrow N) \text{ if } Skip = 0 \\ \begin{pmatrix} \text{for } k \in 0..Points-1 \\ \quad Out^{(k)} \leftarrow N^{(k \cdot Skip)} \end{pmatrix} \text{ otherwise} \\ Out \end{vmatrix}$$

This reads in the data file, strips off diagnostic data and filters by mirror number. Can also skip points to provide "Points" total points in output set.

Test := Read(Data_Name, mirror, Points)    rows(Test) = 3    cols(Test) = 136

Test' := Disp(Test)

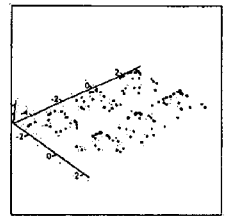

Test', Test'

0I: This function will drive the Planar Comp

Xcoeff := READPRN("SimXcoeff.ini")·0    Read in the Xcoeff matrix. Multiply by 0 to force to null values.

$$Xcoeff = \begin{pmatrix} 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{pmatrix}$$

$Xcoeff_{mirror} := submatrix(Xcoeff, mirror, mirror, 0, cols(Xcoeff) - 2) \cdot 0$    Strips out last control column $Xcoeff_{mirror} := (0\ 0\ 0\ 0\ 0\ 0\ 0)$ $DeltaX(input) :=$ $\Big|$ for $i \in 0.. cols(input) - 1$    Given a set of XYZ data, return contribution of planar terms
$\quad\Big|\ Y \leftarrow (input^{\langle i \rangle})_1$
$\quad\Big|\ Z \leftarrow (input^{\langle i \rangle})_2$
$\quad\Big|\ M_0 \leftarrow 1$
$\quad\Big|\ M_1 \leftarrow Y$
$\quad\Big|\ M_2 \leftarrow Y^2$
$\quad\Big|\ M_3 \leftarrow Y^3$
$\quad\Big|\ M_4 \leftarrow Z$
$\quad\Big|\ M_5 \leftarrow Z^2$
$\quad\Big|\ M_6 \leftarrow Z^3$
$\quad\Big|\ DeltaX_i \leftarrow Xcoeff_{mirror}^T \cdot M$
$DeltaX$

1: Define a Monument

1A: Read a MONUMENT file with the Vertecies and Trianges defined $Mon := READPRN(concat(Mon\_Name, ".mon"))$    Enable this to read in a monument file. Go look at Scatter Points X.mcd to learn how to read in STL files.

$\begin{pmatrix} V \\ Tri \end{pmatrix} :=$ $\Big|\ k \leftarrow j \leftarrow 0$    This takes apart the proprietary monument definition file and prepares it into a list of vertices and a list of the vertices involved in each facet.
$\quad\Big|$ for $i \in 0.. rows(Mon) - 1$
$\quad\quad\Big|$ if $Mon_{i,3} = 0$
$\quad\quad\quad\Big|$ for $m \in 0..2$
$\quad\quad\quad\quad\Big|\ V_{j,m} \leftarrow Mon_{i,m}$
$\quad\quad\quad\Big|\ j \leftarrow j + 1$
$\quad\quad\Big|$ if $Mon_{i,3} = 1$
$\quad\quad\quad\Big|$ for $m \in 0..2$
$\quad\quad\quad\quad\Big|\ Tri_{k,m} \leftarrow Mon_{i,m}$
$\quad\quad\quad\Big|\ k \leftarrow k + 1$
$\begin{pmatrix} V^T \\ Tri \end{pmatrix}$ $Scale := \begin{pmatrix} 1 & 0 & 0 \\ 0 & 1 & 0 \\ 0 & 0 & 1 \end{pmatrix}$    A useful Scale Matrix    $Scale := \begin{pmatrix} 1 & 0 & 0 \\ 0 & -1 & 0 \\ 0 & 0 & -1 \end{pmatrix}$ $V := Scale \cdot V^{\blacksquare}$   The resulting Scaled Vertex Matrix:

$Mon\_Cen := Find_{Center}(V)$   $Mon\_Cen = \begin{pmatrix} 0 \\ 1 \times 10^{-8} \\ 3.333 \times 10^{-9} \end{pmatrix}$   This can be used to center the monument, if its no already there.

$V := Center(V, Mon\_Cen)^{\blacksquare}$

1E: Find the u,v and n vectors $i := 0 .. rows(Tri) - 1$   This is the master index variable to reference individual triangles $v_0 := Tri^{(0)}$   $v_1 := Tri^{(1)}$   $v_2 := Tri^{(2)}$   Column vectors that basically lists which vertex is used in which corner by each triangle $u_i := V^{(v_{1_i})} - V^{(v_{0_i})}$   This is the first edge vector of the triangles $v_i := V^{(v_{2_i})} - V^{(v_{0_i})}$   This is the second edge vector of the triangles $n_i := \dfrac{u_i \times v_i}{|u_i \times v_i|}$   This is the normal vector of the triangles

1G: Define a list of vertecies in an order that allows MathCad to draw the "Mesh"

$V' := Disp(V)$   This creates the displayable version of the vertex list

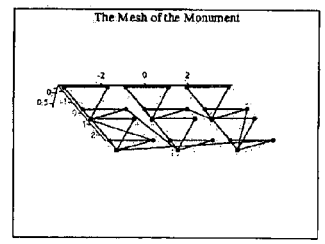

The Mesh of the Monument $V', V'$

1H: Define a Function to return a point on a Plane using parametric coordinates $P_0 := READPRN(concat(Mon\_Name, "MON.txt"))^T$ $P_1 := P_0$ $P_{0'} := Disp(P_0)$   For display...

$P_{1'} := Disp(P_1)$   For display...

SPECIAL CASE: Here, we are reading in P.0 points ON the Monument, and Defining P.1 points to be IDENTICAL. The idea is that there is 100% correspondance between the two data sets, XICP has nothing to do and should reflect that. To test XICP, we will then go about applying SKEW only to P.1 and seeing if we can recover.

-35-

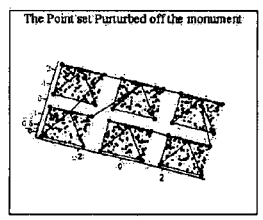

V', P₁'

2: Perturb the Point Set off the Monument $R_{M2X} :=$ READPRN(concat(Mon_Name, "Rm2x.txt")) This is cheating for debug...

$$R_{M2X} = \begin{pmatrix} 0.996 & 0.087 & 0.016 \\ -0.086 & 0.993 & -0.084 \\ -0.023 & 0.082 & 0.996 \end{pmatrix}$$

These functions are now handles by an external point on monument simulator. See Scatter_Points_Builder.

3: Defined core XICP Functions and run some Test cases

3A: Use the function to find the centroid and then subtract it from each cloud

| Try it on the Control Points | Try it on the P.1 Points | These should result in data sets cenetered around 0,0,0 |
|---|---|---|
| $M_0 := Find_{Center}(P_0)$ | $M_1 := Find_{Center}(P_1)$ | |
| $T_0 := Center(P_0, M_0)$ | $T_1 := Center(P_1, M_1)$ | |
| $T_{0'} := Disp(T_0)$ | $T_{1'} := Disp(T_1)$ | |

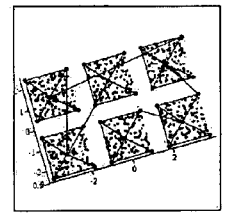

V', T₀'

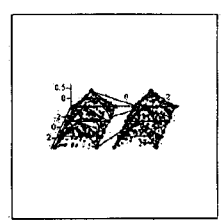

V', T₁'

$P_1 = \begin{array}{|c|c|c|} \hline & 0 & 1 \\ \hline 0 & -0.208 & 0.437 \\ \hline 1 & 2.184 & 1.963 \\ \hline 2 & -0.103 & 0.118 \\ \hline \end{array}$

7

3B: Now create the Find the Rotation using the SVD on the Covariance matrix

$$R' := \text{Find}_{R2}(T_1, T_0) \quad R' = \begin{pmatrix} 1 & 0 & 0 \\ 0 & 1 & 0 \\ 0 & 0 & 1 \end{pmatrix} \quad R_{M2X} = \begin{pmatrix} 0.99605 & 0.08729 & 0.0161 \\ -0.08565 & 0.99279 & -0.08385 \\ -0.0233 & 0.08214 & 0.99635 \end{pmatrix}$$

3C: We can also back out the actual rotation angles from the rotation matrix

$$\text{Find}_{\text{Angles}}(R_{M2X}) = \begin{pmatrix} 4.915 \\ -1.335 \\ -4.713 \end{pmatrix} \text{deg}$$

$$\text{Find}_{\text{Angles}}(R^T) = \begin{pmatrix} 0 \\ 0 \\ 0 \end{pmatrix} \text{deg}$$

3D: Now we apply the rotation and fix the translation to move the Data to the Control

Do all the motion
$P_3 := \text{Move}(P_1, R^T M_1, M_0)$
$P_{3'} := \text{Disp}(P_3)$ Check just the rotations.
$P_2 := R \cdot P_1$
$P_{2'} := \text{Disp}(P_2)$

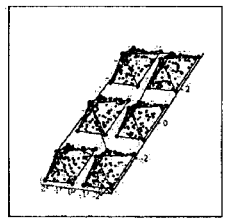
V',P₃'

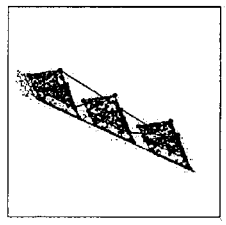
V',P₂'

3E: Needed function to find distance from point to point

| | |
|---|---|
| $D_{P2P}(P_1, P_0) = 0$ | Initial condition |
| $D_{P2P}(T_1, T_0) = 0$ | After centering, before transformation |
| $D_{P2P}(P_2, P_0) = 0$ | Just rotation applied |
| $D_{P2P}(P_3, P_0) = 0$ | After full transformation |

-37-

3F: Needed function to shoot normal and find distance from point to plane $$D_{norm}(Point, index) := n_{index} \cdot (Point - V_{0_{index}})$$

This shoots the point to all the facets and records the distances.

| $D_{norm}(P_0^{(0)}, i) =$ | $D_{norm}(P_1^{(0)}, i) =$ | $D_{norm}(P_2^{(0)}, i) =$ | $D_{norm}(P_3^{(0)}, i) =$ |
|---|---|---|---|
| $2.121 \cdot 10^{-8}$ | $2.121 \cdot 10^{-8}$ | $2.121 \cdot 10^{-8}$ | $2.121 \cdot 10^{-8}$ |
| -0.397 | -0.397 | -0.397 | -0.397 |
| -0.692 | -0.692 | -0.692 | -0.692 |
| -1.089 | -1.089 | -1.089 | -1.089 |
| 2 | 2 | 2 | 2 |
| -2.397 | -2.397 | -2.397 | -2.397 |
| 1.308 | 1.308 | 1.308 | 1.308 |
| -3.089 | -3.089 | -3.089 | -3.089 |

3G: Needed function to find x,y,z coordinate of normal shoot $$P_{norm}(Point, index) := Point - D_{norm}(Point, index) \cdot n_{index}$$

This finds the XYZ location the normal shoot hit on a specific facet.

$$P_1^{(0)} = \begin{pmatrix} -0.208 \\ 2.184 \\ -0.103 \end{pmatrix} \quad P_{norm}(P_1^{(0)}, 0) = \begin{pmatrix} -0.208 \\ 2.184 \\ -0.103 \end{pmatrix} \quad P_{norm}(P_2^{(0)}, 1) = \begin{pmatrix} -0.489 \\ 2.184 \\ 0.178 \end{pmatrix}$$

| $D_{P2P}(P_1^{(0)}, P_{norm}(P_1^{(0)}, i)) =$ | $D_{P2P}(P_2^{(0)}, P_{norm}(P_2^{(0)}, i)) =$ |
|---|---|
| $2.121 \cdot 10^{-8}$ | $2.121 \cdot 10^{-8}$ |
| 0.397 | 0.397 |
| 0.692 | 0.692 |
| 1.089 | 1.089 |
| 2 | 2 |
| 2.397 | 2.397 |
| 1.308 | 1.308 |
| 3.089 | 3.089 |

3H: Needed function to find if x,y,z coordinate from normal shoot is out/on/in triangle $\Delta edge = 1 \times 10^{-5}$ $\quad$ Far = 0.5

$$Test_{in2}(Point, index) := \begin{vmatrix} w \leftarrow Point - V^{(v_{0_{index}})} \\ UU \leftarrow (u_{index} \cdot u_{index}) \\ VV \leftarrow (v_{index} \cdot v_{index}) \\ UV \leftarrow (u_{index} \cdot v_{index}) \\ WU \leftarrow (w \cdot u_{index}) \\ WV \leftarrow (w \cdot v_{index}) \\ s \leftarrow \dfrac{UV \cdot WV - VV \cdot WU}{[(UV)^2 - UU \cdot VV]} \\ t \leftarrow \dfrac{UV \cdot WU - UU \cdot WV}{[(UV)^2 - UU \cdot VV]} \\ IN \leftarrow \left[ ST_{OK} \leftarrow \left[ T_{OK} \leftarrow (S_{OK} \leftarrow 0) \right] \right] \\ S_{IN} \leftarrow \left[ (\Delta edge \leq s) \cdot (s \leq 1 - \Delta edge) \right] \end{vmatrix}$$

This important function evaluates a point on the plane defined by the corners of a triangular facet and determines if the point is inside the facet or outside.

$$T_{IN} \leftarrow \overline{\left[(\Delta edge \le s) \cdot (t \le 1 - \Delta edge)\right]}$$

$$S_{OK} \leftarrow (\Delta edge \le s) \cdot (s \le Far) \cdot T_{IN}\left[s + t \le (1 - \Delta edge)\right]$$

$$T_{OK} \leftarrow (\Delta edge \le t) \cdot (t \le Far) \cdot S_{IN}\left[s + t \le (1 - \Delta edge)\right]$$

$$ST_{OK} \leftarrow \overline{\left[(1 - Far) \le (s + t)\right]} \cdot \overline{\left[s + t \le (1 - \Delta edge)\right]} \cdot S_{IN} \cdot T_{IN}$$

$$ON \leftarrow \left[\left|n_{index} \cdot \left[Point - v^{(vb_{index})}\right]\right| < Epsilon\right]$$

$$IN \leftarrow 1 \quad \text{if} \quad (S_{OK} + T_{OK} + ST_{OK}) \cdot ON$$

$$IN$$

$k := 0 .. cols(P_0) - 1$ $Out_k := Test_{in2}\left(P_{norm}\left(P_1^{(k)}, 2\right), 2\right)$

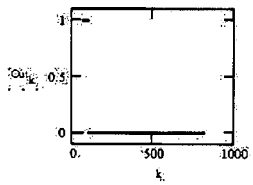

3I: For each point, find the index of the plane that is the minimum distance $$Index2(Point) := \begin{vmatrix} \text{for } i \in 0 .. rows(Tri) - 1 \\ \quad \begin{vmatrix} M_{i,0} \leftarrow i \\ M_{i,1} \leftarrow D_{P2P}(Point, P_{norm}(Point, i)) \end{vmatrix} \\ N \leftarrow csort(M, 1) \\ j \leftarrow 0 \\ \text{for } i \in 0 .. rows(Tri) - 1 \\ \quad \text{if } \left|M_{i,1} - M_{N_{0,0},1}\right| \le Epsilon \\ \quad \quad \begin{vmatrix} Out_j \leftarrow M_{i,0} \\ j \leftarrow j + 1 \end{vmatrix} \\ Out \end{vmatrix}$$

What happened here to generate "Index2" is:
- some triangles have "sisters" on the same plane
- a point from one triangle will generate the same normal intercept for all the sister triangles (same normals)
- the distance from point to the plane will be identical for all sisters
- only one sister triangle will actually have the projected point inside of it, but sorting on distance will not guarantee choosing the right triangle.
- Often, the wrong triangle was choosen by the nearest sorting algoritm, and a valid point was rejected because the projected point was not in the choosen triangle.

So, an array of 1 or more index values comes out of "Index2" and the XICP algorithm has been taught to search each set of possible indices and find one that actually has the projected point in it. This has the effect of allowing more points through.

NEW: I have added the "Safe comparison" feature so the points only have to be within "Epsilon" of each other. We were experiencing floating point errors when working with STL files.

$D_k := Index2\left(P_0^{(k)}\right)$ $J_k := Test_{in2}\left[P_{norm}\left[P_0^{(k)}, (D_k)_0\right], (D_k)_0\right]$

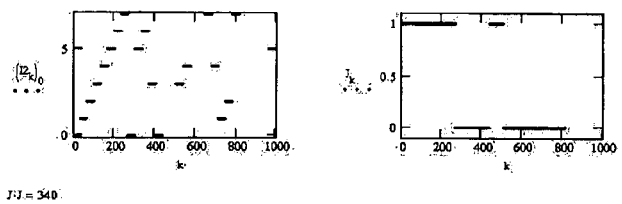

$JJ = 340$

4: Define a XICP based on the subfunctions

$Tol := 1 \times 10^{-7}$    This function performs standard "Normal Shoot" XICP using an XYZ data set and a surface consisting of triangular facets.

```
X2M(Data) := | TEMP_Data ← Data
             | TEMP_Data ← Center(Data, Find_Center(Data))  if PRE_CENTER_FLAG
             | for pass ∈ 0..100
             |    "Index for the trimmed array"
             |    j ← 0
             |    "Go through all the points in the data set"
             |    for m ∈ 0..cols(TEMP_Data) − 1
             |       "Find indecies for the closest triangles, could be array of several sister triangles"
             |       Ω_m ← Index2(TEMP_Data^(m))
             |       "So, go through the array and test each one"
             |       for i ∈ 0..rows(Ω_m) − 1
             |          TEMP_P ← P_norm[ TEMP_Data^(m), (Ω_m)_i ]
             |          TEMP_S ← Test_in2[ TEMP_P, (Ω_m)_i ]
             |          "Ah Ha, pick this one!"
             |          if TEMP_S = 1
             |             SUB_Data^(j) ← Data^(m)
             |             SUB_Control^(j) ← TEMP_P
             |             j ← j + 1
             |    C_data ← Find_Center(SUB_Data)
             |    C_control ← Find_Center(SUB_Control)
             |    R_in ← Find_R2( Center(SUB_Data, C_data), Center(SUB_Control, C_control) )
             |    TEMP_Data ← Move(Data, R_in, C_data, C_control)
             |    TEMP_SUB_Data ← Move(SUB_Data, R_in, C_data, C_control)
             |    RMS_in_pass ← D_P2P(SUB_Control, TEMP_SUB_Data)
             |    Count_in_pass ← j
             |    break if (RMS_in_pass−1 − RMS_in_pass < Tol)·(RMS_in_pass−2 − RMS_in_pass−1 < Tol)  if pass > 10
```

-40-

$$\begin{pmatrix} \text{TEMP\_Data} \\ \text{RMS}_{in} \\ \text{Count}_{in} \\ R_{in} \end{pmatrix}$$

Call ICP $$\begin{pmatrix} \text{Data}_{temp} \\ \text{Status} \\ \text{Count} \\ R \end{pmatrix} := \text{X2M(Test)}$$

This is it. Just define the the data set you want it to chew on and it will grind away to match it to the monumnet defined above. Returns are:
Data_temp = the last set of projections onto the monument.
  In a perfect world, these ARE the P_0 set.
Status = a vector of the RMS distance error for all the points, calculated at the end of each pass
Count = the number of points that were used in each pass
R = the final rotation matrix $$R = \begin{pmatrix} 0.9955 & -0.09149 & -0.02473 \\ 0.09323 & 0.99225 & 0.0821 \\ 0.01703 & -0.08404 & 0.99632 \end{pmatrix}$$

$$R_{M2X}{}^T = \begin{pmatrix} 0.99605 & -0.08565 & -0.0233 \\ 0.08729 & 0.99279 & 0.08\text{?}1\text{?} \\ 0.0161 & -0.08385 & 0.99635 \end{pmatrix} M_i = \begin{pmatrix} 0 \\ 0 \\ 0 \end{pmatrix}$$

$$\text{Find}_{\text{Angles}}(R) = \begin{pmatrix} -5.35022 \\ 0.9756 \\ 4.82129 \end{pmatrix} \text{deg}$$

$$\text{Find}_{\text{Angles}}(R_{M2X}{}^T) = \begin{pmatrix} -5.00847 \\ 0.92235 \\ 4.81052 \end{pmatrix} \text{deg}$$

$$\text{Status}_{\text{rows(Status)}-2} = 0.014$$

$$D_{P2P}(P_0, P_1) = 0$$

$$\text{Status}_{\text{rows(Status)}-1} = 0.014$$

$$D_{P2P}(P_0, \text{Data}_{temp}) = \blacksquare$$

$$D_{P2P}(\text{Center}(P_0, \text{Mon\_Cen}), \text{Data}_{temp}) = \blacksquare$$

$$\text{mean}(\text{Mag}) = \blacksquare$$

pass := 0 .. rows(Count) − 1

$$\text{stdev}(\text{Mag}) = \blacksquare$$

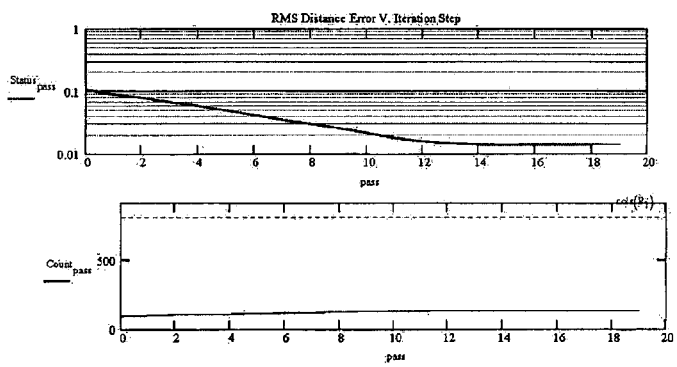

-41-

Conclusions:
- Edges matter, need to be 0.001" or closer to edges, 0.0001 has incredible results!
- Detail on monument maters, the smooth sided one was worse than the double peak.   $\max(\text{Count}) = 132$

6: All about the Skewed Data set, this is XICP

6A: Define the Initial 3D Transform Rotation and Translation values $\Delta\theta_{Scan} := 5 \cdot deg$  Defined at bottom: These are the limits to the random motion of the scanner relative to the X axis $\theta_{Scan} := rnd(2 \cdot \Delta\theta_{Scan}) - \Delta\theta_{Scan}$    $\beta_{Scan} := rnd(2 \cdot \Delta\theta_{Scan}) - \Delta\theta_{Scan}$    $\gamma_{Scan} := 0$ $\theta_{Scan} := 10.2 \cdot deg$    $\beta_{Scan} := 8.3 \cdot deg$ $R_{X2S} := \Delta R(\theta_{Scan}, \beta_{Scan}, \gamma_{Scan})$    $R_{X2S} = \begin{pmatrix} 0.995 & -0.087 & 0.053 \\ 0.087 & 0.996 & 0.005 \\ -0.053 & 0 & 0.999 \end{pmatrix}$ Now we define the SCAN to X frame transformation. This will be used to "skew" the data from X FRAME to SCANNER FRAME. It will be quantified in the XICP stage.

$\begin{pmatrix} \theta_{Scan} \\ \beta_{Scan} \\ \gamma_{Scan} \end{pmatrix} = \begin{pmatrix} -4.987 \\ -3.067 \\ 0 \end{pmatrix} deg$    $FindAngles(R_{X2S}) = \begin{pmatrix} -4.987 \\ -3.067 \\ 0 \end{pmatrix} deg$ $R_{X2S} := READPRN(concat(Mon\_Name, "Rx2s.txt"))$  Enable this to read in a matrix, disable to use the one defined above

6B: Apply the 3D Transforms to pertrub or "Skew" the Scan frame away from the X stage $Mask_x := \begin{pmatrix} 0 & 0 & 0 \\ 0 & 1 & 0 \\ 0 & 0 & 1 \end{pmatrix}$  This mask lets us work only on the YZ values, e.g.

$Mask_{yz} := \begin{pmatrix} 1 & 0 & 0 \\ 0 & 0 & 0 \\ 0 & 0 & 0 \end{pmatrix}$  This mask lets us work only on the X values, e.g.

Its also easy to undo...

Here we learn to be Very Careful... In this version, we want to apply the SKEW to the data (S2X) without any X2M perturbation and without any planar perturbations. We are given a hybrid point from the scanner:

$P_H = \begin{pmatrix} \Delta x_s + x_s \\ y_s \\ z_s \end{pmatrix}$   If we have no planer to consider, its simpler to consider  $P_H = \begin{pmatrix} x_s \\ y_s \\ z_s \end{pmatrix}$  and  $P_X = \begin{pmatrix} X \\ Y \\ Z \end{pmatrix}$ $R_{s2x} \cdot \begin{pmatrix} \Delta x_s \\ y_s \\ z_s \end{pmatrix} + \begin{pmatrix} x_x \\ 0 \\ 0 \end{pmatrix} = \begin{pmatrix} X \\ Y \\ Z \end{pmatrix} = R_{s2x} \cdot \begin{pmatrix} x_s \\ y_s \\ z_s \end{pmatrix} + \begin{pmatrix} 0 \\ 0 \\ 0 \end{pmatrix} = R_{s2x} \cdot Mask_x \cdot \begin{pmatrix} x_s \\ y_s \\ z_s \end{pmatrix} + Mask_{yz} \cdot \begin{pmatrix} x_x \\ y_s \\ z_s \end{pmatrix} = (R_{s2x} \cdot Mask_x + Mask_{yz}) \cdot \begin{pmatrix} x_x \\ y_s \\ z_s \end{pmatrix}$ $(R_{s2x} \cdot Mask_x + Mask_{yz}) \cdot P_H = P_X$   if   $R_{s2x} = \begin{pmatrix} A & B & C \\ D & E & F \\ G & H & I \end{pmatrix}$   then $\begin{pmatrix} 1 & B & C \\ 0 & E & F \\ 0 & H & I \end{pmatrix} \cdot P_H = P_X$    $(R_{s2x} \cdot Mask_x + Mask_{yz}) = \begin{pmatrix} A & B & C \\ D & E & F \\ G & H & I \end{pmatrix} \begin{pmatrix} 0 & 0 & 0 \\ 0 & 1 & 0 \\ 0 & 0 & 1 \end{pmatrix} + \begin{pmatrix} 1 & 0 & 0 \\ 0 & 0 & 0 \\ 0 & 0 & 0 \end{pmatrix} = \begin{pmatrix} 1 & B & C \\ 0 & E & F \\ 0 & H & I \end{pmatrix}$ We will apply them whole sale to all the points. NOTE: We might be perturbing the P1 set or the original P0. We want to test the two perturbations separately at first.

$$\begin{pmatrix} X \\ Y \\ Z \end{pmatrix} = \begin{pmatrix} A & B & C \\ D & E & F \\ G & H & I \end{pmatrix} \cdot \left[ \begin{pmatrix} 0 & 0 & 0 \\ 0 & 1 & 0 \\ 0 & 0 & 1 \end{pmatrix} \cdot \begin{pmatrix} x_s + \Delta x_s \\ y_s \\ z_s \end{pmatrix} + \begin{pmatrix} P + Q \cdot y_s + R \cdot z_s \\ 0 \\ 0 \end{pmatrix} \right] + \begin{pmatrix} 1 & 0 & 0 \\ 0 & 0 & 0 \\ 0 & 0 & 0 \end{pmatrix} \cdot \begin{pmatrix} x_s + \Delta x_s \\ y_s \\ z_s \end{pmatrix} - \begin{pmatrix} P + Q \cdot y_s + R \cdot z_s \\ 0 \\ 0 \end{pmatrix}$$

$$\begin{pmatrix} X \\ Y \\ Z \end{pmatrix} = \begin{pmatrix} A & B & C \\ D & E & F \\ G & H & I \end{pmatrix} \cdot \left[ \begin{pmatrix} 0 & 0 & 0 \\ 0 & 1 & 0 \\ 0 & 0 & 1 \end{pmatrix} \cdot \begin{pmatrix} x_h \\ y_s \\ z_s \end{pmatrix} + \begin{pmatrix} P + Q \cdot y_s + R \cdot z_s \\ 0 \\ 0 \end{pmatrix} \right] + \begin{pmatrix} 1 & 0 & 0 \\ 0 & 0 & 0 \\ 0 & 0 & 0 \end{pmatrix} \cdot \begin{pmatrix} x_h \\ y_s \\ z_s \end{pmatrix} - \begin{pmatrix} P + Q \cdot y_s + R \cdot z_s \\ 0 \\ 0 \end{pmatrix}$$

$P := \text{Xcoeff}^{(0)}$   $Q := \text{Xcoeff}^{(1)}$   $R := \text{Xcoeff}^{(4)}$   $\begin{pmatrix} A & B & C \\ D & E & F \\ G & H & I \end{pmatrix} := R_{XZS}$ $|P| = 0$   $|Q| = 0$   $|R| = 0$ $\text{SkewYou}(\text{Input}) := \begin{vmatrix} \text{for } i \in 0 .. \text{cols}(\text{Input}) - 1 \\ \quad M \leftarrow \text{mirror} \\ \quad \text{Out}^{(i)} \leftarrow \begin{bmatrix} 1 & (A \cdot Q_M + B) & (A \cdot R_M + C) \\ 0 & (D \cdot Q_M + E) & (D \cdot R_M + F) \\ 0 & (G \cdot Q_M + H) & (G \cdot R_M + I) \end{bmatrix}^{-1} \cdot \left[ \begin{pmatrix} \text{Input}_{0,i} \\ \text{Input}_{1,i} \\ \text{Input}_{2,i} \end{pmatrix} - \begin{pmatrix} A \cdot P_M \\ D \cdot P_M \\ G \cdot P_M \end{pmatrix} \right] \\ \quad \text{Out}_{0,i} \leftarrow \text{Out}_{0,i} + (P_M + Q_M \cdot \text{Out}_{1,i} + R_M \cdot \text{Out}_{2,i}) \\ \text{Out} \end{vmatrix}$ $\text{Skew}(\text{Input}, R) := \begin{vmatrix} M \leftarrow R \cdot \text{Mask}_x + \text{Mask}_{yz} \\ \text{for } i \in 0 .. \text{cols}(\text{Input}) - 1 \\ \quad \text{Out}^{(i)} \leftarrow M \cdot \text{Input}^{(i)} \\ \text{Out} \end{vmatrix}$   $\text{Unskew}(\text{Input}, R) := \begin{vmatrix} M \leftarrow R \cdot \text{Mask}_x + \text{Mask}_{yz} \\ \text{for } i \in 0 .. \text{cols}(\text{Input}) - 1 \\ \quad \text{Out}^{(i)} \leftarrow M^{-1} \cdot \text{Input}^{(i)} \\ \text{Out} \end{vmatrix}$   Save the way it was. It worked but was backwards

================================================================================

$\text{UnskewYou}(\text{Input}, R) := \begin{vmatrix} \text{for } i \in 0 .. \text{cols}(\text{Input}) - 1 \\ \quad \Delta x \leftarrow \text{Xcoeff}_{\text{mirror},0} + \text{Xcoeff}_{\text{mirror},1} \cdot \text{Input}_{1,i} + \text{Xcoeff}_{\text{mirror},4} \cdot \text{Input}_{2,i} \\ \quad \text{Out}^{(i)} \leftarrow R \cdot \left[ \text{Mask}_x \cdot \text{Input}^{(i)} + \begin{pmatrix} \Delta x \\ 0 \\ 0 \end{pmatrix} \right] + \text{Mask}_{yz} \cdot \text{Input}^{(i)} - \begin{pmatrix} \Delta x \\ 0 \\ 0 \end{pmatrix} \\ \text{Out} \end{vmatrix}$ $\text{Skew}(\text{Input}, R) := \begin{vmatrix} M \leftarrow R \cdot \text{Mask}_x + \text{Mask}_{yz} \\ \text{for } i \in 0 .. \text{cols}(\text{Input}) - 1 \\ \quad \text{Out}^{(i)} \leftarrow M^{-1} \cdot \text{Input}^{(i)} \\ \text{Out} \end{vmatrix}$   $\text{Unskew}(\text{Input}, R) := \begin{vmatrix} M \leftarrow R \cdot \text{Mask}_x + \text{Mask}_{yz} \\ \text{for } i \in 0 .. \text{cols}(\text{Input}) - 1 \\ \quad \text{Out}^{(i)} \leftarrow M \cdot \text{Input}^{(i)} \\ \text{Out} \end{vmatrix}$   This works on NON-PLANER data $P_{skew} := SkewYou(P_0)$    Define the "skewed" data set $P_{skew} := Skew(P_0, R_{X2S})$ $D_{P2P}(P_{skew}, P_0) = 0.03117$    Compare the mean perturbation

6C: We need functions to Collapse both the Data and the Control sets $$Compress_{Control}(Data, Control) := \begin{vmatrix} \text{for } i \in 0..cols(Data)-1 \\ \quad \Delta x_s \leftarrow Xcoeff_{mirror,0} + Xcoeff_{mirror,1} \cdot Data_{1,i} + Xcoeff_{mirror,4} \cdot Data_{2,i} \\ \quad Out^{(i)} \leftarrow Control^{(i)} - Mask_{yz} \cdot Data^{(i)} + \begin{pmatrix} \Delta x_s \\ 0 \\ 0 \end{pmatrix} \\ Out \end{vmatrix}$$

$$Compress_{Data}(Data) := \begin{vmatrix} \text{for } i \in 0..cols(Data)-1 \\ \quad \Delta x_s \leftarrow Xcoeff_{mirror,0} + Xcoeff_{mirror,1} \cdot Data_{1,i} + Xcoeff_{mirror,4} \cdot Data_{2,i} \\ \quad Out^{(i)} \leftarrow Mask_x \cdot Data^{(i)} + \begin{pmatrix} \Delta x_s \\ 0 \\ 0 \end{pmatrix} \\ Out \end{vmatrix}$$

$$Compress_{Control}(Data, Control) := \begin{vmatrix} \text{for } i \in 0..cols(Data)-1 \\ \quad Out^{(i)} \leftarrow Control^{(i)} - Mask_{yz} \cdot Data^{(i)} \\ Out \end{vmatrix}$$

$$Compress_{Data}(Data) := \begin{vmatrix} \text{for } i \in 0..cols(Data)-1 \\ \quad Out^{(i)} \leftarrow Mask_x \cdot Data^{(i)} \\ Out \end{vmatrix}$$

$P_{skewA} := Compress_{Control}(P_{skew}, P_0)$    $P_{0A} := Compress_{Data}(P_{skew})$    THIS WORKS when Skew/Unskew are done right!

$P_{skewA} := Compress_{Control}(P_0, P_{skew})$    $P_{0A} := Compress_{Data}(P_0)$    This seems like the way it should be..., worked with old Skew/Unskew $P_{0A} := Compress_{Control}(P_0, P_{skew})$    $P_{skewA} := Compress_{Data}(P_0)$    The way it was before all the changes $D_{P2P}(P_{skewA}, P_{0A}) = 0.03117$    Compare the mean perturbation, is it the same as vefore compression?

$P_{0A'} := Disp(P_{0A})$    $P_{skewA'} := Disp(P_{skewA})$

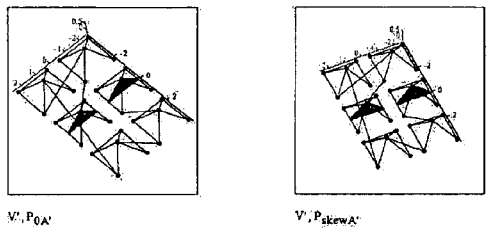

V', $P_{0A'}$          V', $P_{skewA'}$ $M_{0A} := \text{Find}_{Center}(P_{0A})$    Then we find the centers $M_{skewA} := \text{Find}_{Center}(P_{skewA})$ $$M_{0A} = \begin{pmatrix} 0 \\ -8.707 \times 10^{-3} \\ -0.015 \end{pmatrix} \quad M_{skewA} = \begin{pmatrix} 1.22 \times 10^{-3} \\ -8.684 \times 10^{-3} \\ -0.015 \end{pmatrix}$$

$T_{0A} := \text{Center}(P_{0A}, M_{0A})$    Then we apply the centers $T_{skewA} := \text{Center}(P_{skewA}, M_{skewA})$ $R_{AT'} := \text{Find}_{R2}(T_{skewA}, T_{0A})$    Now we find the rotation matrix with centering $R_{A'} := \text{Find}_{R2}(P_{skewA}, P_{0A})$    And without centering We look at many diagnostics:

$$R_{A'} = \begin{pmatrix} 0.9973 & 0.02063 & 0.07041 \\ -0.02069 & 0.99979 & -2.98234 \times 10^{-11} \\ -0.07039 & -0.00146 & 0.99752 \end{pmatrix} \quad R_{AT'} = \begin{pmatrix} 0.9973 & 0.02063 & 0.07041 \\ -0.02069 & 0.99979 & -2.9459 \times 10^{-11} \\ -0.07039 & -0.00146 & 0.99752 \end{pmatrix}$$

$$R_{X2S} = \begin{pmatrix} 0.9973 & -0.02069 & -0.07039 \\ 0.02063 & 0.99979 & -0.00146 \\ 0.07041 & 0 & 0.99752 \end{pmatrix}$$

$$\text{Find}_{Angles}(R_{A'}^T) = \begin{pmatrix} -1.18532 \\ 4.03747 \\ 1.713 \times 10^{-9} \end{pmatrix} \text{deg} \quad \text{Find}_{Angles}(R_{AT'}^T) = \begin{pmatrix} -1.18532 \\ 4.03747 \\ 1.69208 \times 10^{-9} \end{pmatrix} \text{deg}$$

$$\text{Find}_{Angles}(R_{X2S}) = \begin{pmatrix} -1.18532 \\ 4.03747 \\ 0 \end{pmatrix} \text{deg}$$

$$P_{2A} := \text{Move}\left[P_{skewA}, R_{A'}, \begin{pmatrix} 0 \\ 0 \\ 0 \end{pmatrix}, \begin{pmatrix} 0 \\ 0 \\ 0 \end{pmatrix}\right]$$

Apply the rotation and recenter the data set

-46-

$P_{2AT} := \text{Move}(P_{skewA}, R_{AT}, M_{skewA}, M_{0A})$  Apply the rotation and recenter the data set $$D_{P2P}(P_{2A}, P_{2AT}) = 5.50124 \times 10^{-11}$$

6D: We also need to Expand the Data back to its original extent $P_{3A} := \text{Unskew}(P_{skew}, R_A^T)$  Here we call the function using the original and the recentered data
$P_{3AT} := \text{Unskew}(P_{skew}, R_{AT}^T)$ $\tilde{P}_{3A} := \text{Disp}(P_{3A})$  $\tilde{P}_{3AT} := \text{Disp}(P_{3AT})$

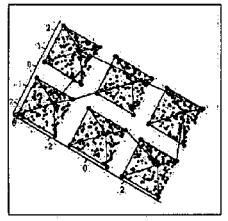

$V', P_{3A}$  $V', P_{3AT}$ $D_{P2P}(P_0, P_0) = 0$  This is the RMS after Skew but before XICP. This calculates against both P:0 and P:1, depends on which data set was skewed above $D_{P2P}(P_{skew}, P_0) = 0.03117$ $D_{P2P}(P_{skewA}, P_{0A}) = 0.03117$  The RMS did not change it when skewed. Note: P:0A got defined properly above $D_{P2P}(P_{2A}, P_{0A}) = 5.736 \times 10^{-9}$  XICP fixed most of the RMS!

$D_{P2P}(P_{2AT}, P_{0A}) = 5.735 \times 10^{-9}$  XICP fixed most of the RMS!

$D_{P2P}(P_{3A}, P_0) = 5.73571 \times 10^{-9}$  Shouldn't have residual XICP errors once the data is expanded...

$D_{P2P}(P_{3AT}, P_0) = 5.73571 \times 10^{-9}$  Shouldn't have residual XICP errors once the data is expanded...

6F: We will need to move the projected Control Data to the Data frame $\text{Tango}(Data, R, C_{data}, C_{control}) := \begin{vmatrix} \text{for } k \in 0..\text{cols}(Data) - 1 \\ \begin{vmatrix} Data_T^{(k)} \leftarrow Data^{(k)} - (C_{control} - R \cdot C_{data}) \\ Data_{Offset}^{(k)} \leftarrow R^T \cdot Data_T \end{vmatrix} \\ Data_{Offset} \end{vmatrix}$ $Data_{Offset}^{(k)} = R \cdot Data^{(k)} + (C_{control} - R \cdot C_{data})$ $D_{P2P}(P_3, P_0) = 0$
$D_{P2P}(P_1, P_0) = 0$ fixed this once $$P_{0X}^{(k)} := R^T \left[ P_0^{(k)} - (M_0 - R' M_1) \right]$$

$$P_{0Tango} := Tango(P_0, R', M_1, M_0)$$

$$D_{P2P}(P_{0X}, P_1) = 0$$

$$D_{P2P}(P_{0Tango}, P_1) = 0$$

$$M_0 - R' M_1 = \begin{pmatrix} 0 \\ 0 \\ 0 \end{pmatrix}$$

$$T(T_x, T_y, T_z) = \bullet$$

XX. The Ballet Algorithm does XICP wrapped around X2M

```
Ballet(Data) :=  SKEW_Data ← Data
                 TEMP_Data ← SKEW_Data
                 TEMP_Data ← Center(SKEW_Data, Find_Center(SKEW_Data)) if PRE_CENTER_FLAG
                 PREV_R_in ← R_in ← C_data ← C_control ← SUB_Control ← SUB_Data ← 0
                 PingPong ← 0
                 "k is the index for the outer Ballet loop"
                 for k ∈ 0..100
                     "Only do outer XICP if rough X2M is done"
                     if PingPong = 1
                         X_SUB_Control ← Tango(SUB_Control, R_in, C_data, C_control)
                         COMP_X_SUB_Data ← Compress_Data(SUB_Data)
                         COMP_X_SUB_Control ← Compress_Control(SUB_Data, X_SUB_Control)
                         COMP_C_data ← Find_Center(COMP_X_SUB_Data)
                         COMP_C_control ← Find_Center(COMP_X_SUB_Control)
                         CEN_C_data ← Center(COMP_X_SUB_Data, COMP_C_data)
                         CEN_C_control ← Center(COMP_X_SUB_Control, COMP_C_control)
                         R_out ← Find_R2(CEN_C_data, CEN_C_control)
                         Temp ← Find_Angles(R_out)
                         R_out ← R_z(Temp_0) R_y(Temp_1)
                         SKEW_Data ← UnskewYou(Data, R_out)
                         TEMP_Data ← Move(SKEW_Data, R_in, C_data, C_control)
                     "Inner X2M Loop"
                     for pass ∈ 0..20
                         "Index for the trimmed array"
                         j ← 0
                         "Go through all the points in the data set"
                         for m ∈ 0..cols(TEMP_Data) - 1
                             "Find indicies for the closest triangles, could be array of several sister triangles"
                             I2_m ← Index2(TEMP_Data^(m))
                             "So, go through the array and test each one"
                             for i ∈ 0..rows(I2_m) - 1
                                 TEMP_P ← P_norm[ TEMP_Data^(m), (I2_m)_i ]
                                 TEMP_S ← Test_in2[ TEMP_P, (I2_m)_i ]
                                 "Ah Ha, pick this one!"
                                 if TEMP_S = 1
                                     SUB_Data^(j) ← Data^(m)
                                     SUB_SKEW_Data^(j) ← SKEW_Data^(m)
                                     SUB_Control^(j) ← TEMP_P
                                     j ← j + 1
```

-49-

$$\begin{vmatrix} C_{data} \leftarrow \text{Find}_{Center}(\text{SUB\_SKEW\_Data}) \\ C_{control} \leftarrow \text{Find}_{Center}(\text{SUB\_Control}) \\ R_{in} \leftarrow \text{Find}_{R2}\left(\text{Center}(\text{SUB\_SKEW\_Data}, C_{data}), \text{Center}(\text{SUB\_Control}, C_{control})\right) \\ \text{TEMP\_Data} \leftarrow \text{Move}(\text{SKEW\_Data}, R_{in}, C_{data}, C_{control}) \\ \text{TEMP\_SUB\_Data} \leftarrow \text{Move}(\text{SUB\_SKEW\_Data}, R_{in}, C_{data}, C_{control}) \\ \text{if PingPong} = 0 \\ \quad \begin{vmatrix} \text{RMS}_{in_{pass}} \leftarrow D_{P2P}(\text{SUB\_Control}, \text{TEMP\_SUB\_Data}) \\ \text{Count}_{in_{pass}} \leftarrow j \\ \text{break if } \left(\text{RMS}_{in_{pass-1}} - \text{RMS}_{in_{pass}} < \text{Tol}\right) \cdot \left(\text{RMS}_{in_{pass-2}} - \text{RMS}_{in_{pass-1}} < \text{Tol}\right) \text{ if (pass > 10)} \end{vmatrix} \\ \text{break if PingPong} = 1 \\ \text{"After we get here the 1st time, we must play Ping Pong until done"} \\ \text{PingPong} \leftarrow 1 \text{ if PingPong} = 0 \\ \text{RMS}_{out_k} \leftarrow D_{P2P}(\text{SUB\_Control}, \text{TEMP\_SUB\_Data}) \\ \text{"After every pass of XICP and then X2M, we get the chance to bail"} \\ \text{break if } \left(\text{RMS}_{out_{k-1}} - \text{RMS}_{out_k} < \text{Tol}\right) \cdot \left(\text{RMS}_{out_{k-2}} - \text{RMS}_{out_{k-1}} < \text{Tol}\right) \text{ if k > 5} \\ \begin{pmatrix} \text{TEMP\_Data} \\ \text{RMS}_{in} \\ \text{Count}_{in} \\ R_{in} \\ \text{RMS}_{out} \\ R_{out} \\ C_{control} - R_{in} \cdot C_{data} \end{pmatrix} \end{vmatrix}$$

$$\begin{pmatrix} \text{TEMP\_Data} \\ \text{RMS}_{in} \\ \text{Count}_{in} \\ R_{in} \\ \text{RMS}_{out} \\ R_{out} \\ T_{in} \end{pmatrix} := \text{Ballet(Test)} \qquad \begin{pmatrix} \text{TEMP\_Data} \\ \text{RMS}_{in} \\ \text{Count}_{in} \\ R_{in} \\ \text{RMS}_{out} \\ R_{out} \\ T_{in} \end{pmatrix} = \begin{pmatrix} (3,136) \\ (20,1) \\ (20,1) \\ (3,3) \\ (60,1) \\ (3,3) \\ (3,1) \end{pmatrix}$$

R.in is the rotation matrix to take the data from X frame to MON frame $$R_{in} = \begin{pmatrix} 0.99605 & -0.08565 & -0.0233 \\ 0.08729 & 0.99279 & 0.08214 \\ 0.0161 & -0.08385 & 0.99635 \end{pmatrix} \qquad R_{M2X}^T = \begin{pmatrix} 0.99605 & -0.08565 & -0.0233 \\ 0.08729 & 0.99279 & 0.08214 \\ 0.0161 & -0.08385 & 0.99635 \end{pmatrix}$$

$$\text{Find}_{\text{Angles}}(R_{in}) = \begin{pmatrix} -5.0085 \\ 0.92236 \\ 4.81052 \end{pmatrix} \text{deg} \qquad \text{Find}_{\text{Angles}}(R_{M2X}^T) = \begin{pmatrix} -5.00847 \\ 0.92235 \\ 4.81052 \end{pmatrix} \text{deg}$$

$$|\text{Find}_{\text{Angles}}(R_{in})| = 7.0054875 \text{ deg} \qquad |\text{Find}_{\text{Angles}}(R_{M2X}^T)| = 7.0054722 \text{ deg}$$

$$((|\text{Find}_{\text{Angles}}(R_{in})| - |\text{Find}_{\text{Angles}}(R_{M2X}^T)|) \cdot 20 = 5.333 \times 10^{-6}$$

R.out is the rotation to take the data from SCAN frame to X frame $$R_{out} = \begin{pmatrix} 0.9973 & -0.02069 & -0.07039 \\ 0.02063 & 0.99979 & -0.00146 \\ 0.07041 & 0 & 0.99752 \end{pmatrix} \qquad R_{X2S} = \begin{pmatrix} 0.9973 & -0.02069 & -0.07039 \\ 0.02063 & 0.99979 & -1.4565 \times 10^{-3} \\ 0.07041 & 0 & 0.99752 \end{pmatrix}$$

$$\text{Find}_{\text{Angles}}(R_{out}) = \begin{pmatrix} -1.18529 \\ 4.0375 \\ 0 \end{pmatrix} \text{deg} \qquad \text{Find}_{\text{Angles}}(R_{X2S}) = \begin{pmatrix} -1.18532 \\ 4.03747 \\ 0 \end{pmatrix} \text{deg}$$

$$|\text{Find}_{\text{Angles}}(R_{out})| = 4.20789 \text{ deg} \qquad |\text{Find}_{\text{Angles}}(R_{X2S})| = 4.20787 \text{ deg}$$

$$((|\text{Find}_{\text{Angles}}(R_{out})| - |\text{Find}_{\text{Angles}}(R_{X2S})|) \cdot 20 = 5.333 \times 10^{-6}$$

The inner loop quits early (by design)

$$\text{RMS}_{in_{\text{rows}(\text{RMS}_{in})-2}} - \text{RMS}_{in_{\text{rows}(\text{RMS}_{in})-1}} = -4.38677 \times 10^{-5} \quad \text{The differential improvement on the last pass of inner loop only}$$

$$\text{RMS}_{in_{\text{rows}(\text{RMS}_{in})-1}} = 1.44278 \times 10^{-2} \quad \text{The magnitude on the last pass of inner loop only}$$

The outer loop takesover when the inner loop quits $$\text{RMS}_{out_{\text{rows}(\text{RMS}_{out})-2}} - \text{RMS}_{out_{\text{rows}(\text{RMS}_{out})-1}} = 7.903 \times 10^{-8} \quad \text{The differential improvement on the last pass of the oputer loop}$$

$$\text{RMS}_{out_{\text{rows}(\text{RMS}_{out})-1}} = 3.978 \times 10^{-7} \quad \text{The magnitude on the last pass of the outer loop}$$

$$\text{pass}_{in} := 0 .. \text{rows}(\text{RMS}_{in}) - 1$$
$$k := 0 .. \text{rows}(\text{RMS}_{out}) - 1$$

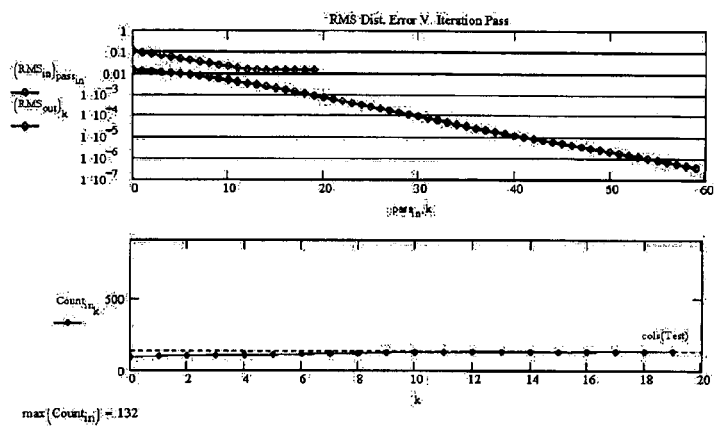

5: Run XICP based on the setting in the "Control Panel"

| Control Panel | |
|---|---|
| Data_Name = "FrontPeaks_24_FULL_SIM.txt" | |
| Points = 2000 | |
| Mon_Name = "FrontPeaks_24_" | The CAD file has a name... we would like to re-use it for the output files |
| Δedge = -0.00001 | This sets how close a point can come to an edge an still be considered. XICP work better when the points are allowed WAY CLOSE to the edge |
| Far = 0.5 | This sets how far away a point can be from an edge an still be considered. XICP work better when the points are allowed WAY CLOSE to the edge and is only mildly impressed by points in the middle of a face. |
| Tol = 0.0000001 | This is an experimental variable used to let XICP shut itself off when its achieved "bottom out" behaviour. So far, looks like it must be set at 10^-8 or lower or there is error still left to be removed. Try 0.000001 |
| Epsilon = 0.000001 | Epsilon is used to control the "Safe Comparison", which was added to get around floating point errors when working with CAD data for the monument |
| mirror = 1 | When working with real or simulated data, we need to either keep track of mirror number ( a big rewrite) or we can filter to only work with data from one mirror. This will control which mirror is read in and make sure the correct line from the Xceoff.ini file is read in. |
| PRE_CENTER_FLAG = 1 | X2M and XICP can handle larger initial offsets of the Pre-Centering is used. However, when testing with points already ON the MONUMENT, precentering just injects errors, so here we can turn it off by setting to "0". |

Table 2

Table 2 contains a Mathcad sheet that specifies two different algorithms that may be used to find the value of $x_{ce}$.

findcenter.mcd
Basic 3D Vector and Homogeneous Coordinate Relationships $H2V(v) := \left( \dfrac{v_0}{v_3} \quad \dfrac{v_1}{v_3} \quad \dfrac{v_2}{v_3} \right)^T$    Convert a homogenous point to a 3D vector. Useful for finding cross products $T(x,y,z) := \begin{pmatrix} 1 & 0 & 0 & x \\ 0 & 1 & 0 & y \\ 0 & 0 & 1 & z \\ 0 & 0 & 0 & 1 \end{pmatrix}$    Generate a translation matrix given XYZ coordinates $Tv(v) := T(v_0, v_1, v_2)$    Generate a translation matrix given a vector quantity $R_{Axis}(axis, angle) :=$
$\quad c \leftarrow \cos(angle)$
$\quad s \leftarrow \sin(angle)$
$\quad t \leftarrow 1 - c$
$\quad axis \leftarrow \dfrac{axis}{|axis|}$
$\quad x \leftarrow axis_0$
$\quad y \leftarrow axis_1$
$\quad z \leftarrow axis_2$ $\begin{pmatrix} t \cdot x^2 + c & t \cdot x \cdot y - s \cdot z & t \cdot x \cdot z + s \cdot y & 0 \\ t \cdot x \cdot y + s \cdot z & t \cdot y^2 + c & t \cdot y \cdot z - s \cdot x & 0 \\ t \cdot x \cdot z - s \cdot y & t \cdot y \cdot z + s \cdot x & t \cdot z^2 + c & 0 \\ 0 & 0 & 0 & 1 \end{pmatrix}$ This can be done with quaternions... but the quaternion math has been done and put directly into matrix form. It is mathematically the same as quaternions. It just simplifies to the following matrix form which is how we need the data to end up.

$R_{Axis3}(axis, angle) :=$
$\quad mat \leftarrow R_{Axis}(axis, angle)$
$\quad submatrix(mat, 0, 2, 0, 2)$ $R_x(angle) := R_{Axis}((1 \ 0 \ 0)^T, angle)$
$R_y(angle) := R_{Axis}((0 \ 1 \ 0)^T, angle)$
$R_z(angle) := R_{Axis}((0 \ 0 \ 1)^T, angle)$ These are the basic x,y,z axis rotations. Typically these are done as special cases but since we have the RotAxis function we can use it to provide a compact way to write the specific orthogonal cases.

$Unit(v1) := \dfrac{v1}{|v1|}$    Convert a vector to a unit vector $VectorAngle(v1, v2) := a\cos\left( \dfrac{v1 \cdot v2}{|v1| \cdot |v2|} \right)$    This function calculates the angle between a pair of vectors in radians.

Find Center of Rotation Given Three 3D Points In 3 Coordinate Frames

1A: Run through the basic math for finding the center and axis of rotation

The following runs through the math for finding the center of rotation. The algorithm finds the intersection of 3 planes. The result is a point and a vector defining an axis in 3 space.

Points
$$P_1 := \begin{pmatrix} 2 \\ 1 \\ 0 \end{pmatrix} \quad P_2 := \begin{pmatrix} 1 \\ 2 \\ 0 \end{pmatrix} \quad P_3 := \begin{pmatrix} 1 \\ 0 \\ 0 \end{pmatrix}$$

Bisector Points
$$P_{b1} := \frac{P_1 + P_2}{2} \quad P_{b2} := \frac{P_2 + P_3}{2}$$

$$P_{b1} = \begin{pmatrix} 1.5 \\ 1.5 \\ 0 \end{pmatrix} \quad P_{b2} = \begin{pmatrix} 1 \\ 1 \\ 0 \end{pmatrix}$$

Segment Vectors
$$V_1 := (P_1 - P_2) \quad V_2 := (P_3 - P_2)$$

$$V_1 = \begin{pmatrix} 1 \\ -1 \\ 0 \end{pmatrix} \quad V_2 = \begin{pmatrix} 0 \\ -2 \\ 0 \end{pmatrix}$$

Axis of Rotation
$$V_r := (V_1 \times V_2)$$

$$V_r = \begin{pmatrix} 0 \\ 0 \\ -2 \end{pmatrix}$$

Rotation Plane Offset
$$D_r := (V_r \cdot P_1)$$

$$D_r = 0$$

BiSector Plane Offsets
$$D_1 := (P_{b1} \cdot V_1) \quad D_2 := (P_{b2} \cdot V_2)$$

$$D_1 = 0 \quad D_2 = -2$$

Now we have 3 planes, two for the bisectors and one for the plane of rotation. These 3 planes intersect at a point on the axis of rotation.

$$D := \begin{pmatrix} D_1 \\ D_2 \\ D_r \end{pmatrix} \qquad D = \begin{pmatrix} 0 \\ -2 \\ 0 \end{pmatrix}$$

$$N := \text{stack}\left(V_1^T, V_2^T, V_r^T\right)$$

$$N = \begin{pmatrix} 1 & -1 & 0 \\ 0 & -2 & 0 \\ 0 & 0 & -2 \end{pmatrix}$$

$P_{center} := N^{-1} \cdot D$      Find center of rotation by finding intersection of 3 planes using a simple inverse $$P_{center} = \begin{pmatrix} 1 \\ 1 \\ 0 \end{pmatrix}$$

$N \cdot P_{center} = \begin{pmatrix} 0 \\ -2 \\ 0 \end{pmatrix}$      Verify by plugging center point back in to obtain the plane offsets $|P_{center} - P_1| = 1$
$|P_{center} - P_2| = 1$      Distance from original three points should all be the same:
$|P_{center} - P_3| = 1$

1B: Function for finding center and axis of rotation

$\text{RotationCenter}(p1, p2, p3) :=$ "Find vectors used to find axis of rotation"
$\quad V_1 \leftarrow p2 - p1$
$\quad V_2 \leftarrow p3 - p1$
"Find Bisector points"
$\quad P_{b1} \leftarrow \dfrac{p2 + p1}{2}$
$\quad P_{b2} \leftarrow \dfrac{p3 + p1}{2}$
"Find Axis of rotation"
$\quad V_r \leftarrow V_2 \times V_1$
"Find Plane Offsets"
$\quad D_1 \leftarrow V_1 \cdot P_{b1}$
$\quad D_2 \leftarrow V_2 \cdot P_{b2}$
$\quad D_r \leftarrow V_r \cdot P_1$
"Generate a vector of plane offsets"
$\quad D \leftarrow \text{stack}(D_1, D_2, D_r)$
"Generate matrix of normal vectors"
$\quad N \leftarrow \text{stack}\left((V_1)^T, (V_2)^T, V_r^T\right)$
"Solve for the center via matrix inversion"
$\quad \text{center} \leftarrow N^{-1} \cdot D$
"Return the center, unit axis and radius"
$\quad \begin{pmatrix} \text{center} \\ \text{Unit}(V_r) \end{pmatrix}$ Test Case $\quad p1 := \begin{pmatrix} \text{rnd}(1) \\ \text{rnd}(2) \\ \text{rnd}(3) \end{pmatrix} \quad p2 := \begin{pmatrix} \text{rnd}(1) \\ \text{rnd}(2) \\ \text{rnd}(3) \end{pmatrix} \quad p3 := \begin{pmatrix} \text{rnd}(1) \\ \text{rnd}(2) \\ \text{rnd}(3) \end{pmatrix}$ $\begin{pmatrix} \text{center} \\ \text{axis} \end{pmatrix} := \text{RotationCenter}(p1, p2, p3)$ $\text{center} = \begin{pmatrix} 1.205 \\ 1.095 \\ 1.51 \end{pmatrix} \quad \text{axis} = \begin{pmatrix} 0.873 \\ 0.196 \\ 0.447 \end{pmatrix}$ $|p1 - \text{center}| = 1.418$
$|p2 - \text{center}| = 1.418$
$|p3 - \text{center}| = 1.418$

Find Center of Rotation Given Four 3D Points In 2 Coordinate Frames

1C: Run through the basic math for finding the center and axis of rotation

The basic algorithm is to find similar to above. Find two planes using bisectors and the third plane using the normal vector from the cross product and assuming that this plane has a zero D value (this value may be arbitrarily choosen). With three planes known their intersection can easily be found by matrix inversion.

Given 4 points:
$$Pa_1 := \begin{pmatrix} -4 \\ 0 \\ 0 \end{pmatrix} \quad Pa_2 := \begin{pmatrix} -2 \\ 2 \\ 0 \end{pmatrix} \quad Pb_1 := \begin{pmatrix} 2 \\ 2 \\ 0 \end{pmatrix} \quad Pb_2 := \begin{pmatrix} 4 \\ 0 \\ 0 \end{pmatrix}$$

Bisectors:
$$Bs_1 := \frac{Pb_1 + Pa_1}{2} \quad Bs_2 := \frac{Pb_2 + Pa_2}{2}$$

Vectors:
$$V_1 := Pa_1 - Pb_1 \quad V_2 := Pa_2 - Pb_2$$

Orthogonal:
$$V_r := V_2 \times V_1$$

$$D_1 := V_1 \cdot Bs_1 \quad D_2 := V_2 \cdot Bs_2 \quad D_r := 0 \quad V_1 = \begin{pmatrix} -6 \\ -2 \\ 0 \end{pmatrix} \quad V_2 = \begin{pmatrix} -6 \\ 2 \\ 0 \end{pmatrix} \quad V_r = \begin{pmatrix} 0 \\ 0 \\ 24 \end{pmatrix}$$

$$center := stack(V_1^T, V_2^T, V_r^T)^{-1} \cdot \begin{pmatrix} D_1 \\ D_2 \\ D_r \end{pmatrix} \quad center = \begin{pmatrix} 0 \\ -2 \\ 0 \end{pmatrix} \quad stack(V_1^T, V_2^T, V_r^T) = \begin{pmatrix} -6 & -2 & 0 \\ -6 & 2 & 0 \\ 0 & 0 & 24 \end{pmatrix}$$

$$|Bs_1 - center| = 3.162 \quad |Pa_1 - center| = 4.472 \quad |Pb_1 - center| = 4.472$$
$$|Bs_2 - center| = 3.162 \quad |Pa_2 - center| = 4.472 \quad |Pb_2 - center| = 4.472$$

1D: Write a Function that Finds the Center and Axis Given 2 Coordinate Frames.

It is most likely that we will solve this problem given 2 reference frames so we'll write a function to solve this given two transformation matrices. From here we pick two arbitrary points in the frame and resolve them into each transformation frame. These 4 points can be used to find bisector planes that are intersected with cross product plane (arbitrarily fixed at $x = 0$). Thus the problem reduces to an intersection of 3 planes.

$$\text{RotCenterFromFrames}(T_1, T_2) := \begin{vmatrix} p1 \leftarrow (0 \ 500 \ 0 \ 1)^T & \text{Arbitrary points} \\ p2 \leftarrow (0 \ 0 \ 500 \ 1)^T & \\ Pa_1 \leftarrow H2V(T_1 \cdot p1) & \text{Transformed into 2 Frames} \\ Pa_2 \leftarrow H2V(T_1 \cdot p2) & \\ Pb_1 \leftarrow H2V(T_2 \cdot p1) & \\ Pb_2 \leftarrow H2V(T_2 \cdot p2) & \\ Bs_1 \leftarrow \dfrac{Pa_1 + Pb_1}{2} & \text{Find Bisectors} \\ Bs_2 \leftarrow \dfrac{Pa_2 + Pb_2}{2} & \\ V_1 \leftarrow (Pa_1) - (Pb_1) & \text{Three planes} \\ V_2 \leftarrow (Pa_2) - (Pb_2) & \\ V_r \leftarrow \text{Unit}(V_1 \times V_2) & \\ \text{center} \leftarrow \text{stack}\left((V_1)^T, (V_2)^T, (V_r)^T\right)^{-1} \cdot \begin{pmatrix} V_1 \cdot Bs_1 \\ V_2 \cdot Bs_2 \\ 0 \end{pmatrix} & \text{Solve intersection of three planes} \\ \begin{pmatrix} \text{stack}(\text{center}, 1) \\ \text{Unit}(V_r) \end{pmatrix} & \text{Return arbitrary point on axis of rotation and the axis vector} \end{vmatrix}$$

Calculate the distance from a point to a line. This value will always be non-negative.

$$\text{Dist}_{P2L}(\text{pth}, \text{vec}, \text{vpth}) := \begin{vmatrix} pt \leftarrow (pth_0 \ pth_1 \ pth_2)^T \\ vpt \leftarrow (vpth_0 \ vpth_1 \ vpth_2)^T \\ t \leftarrow \dfrac{(pt - vpt) \cdot vec}{vec \cdot vec} \\ (\text{ptline} \leftarrow vpt + t \cdot vec) \\ |pt - \text{ptline}| \end{vmatrix}$$

1E: Aligning Monument Axis To Global Axis

With the functions for rotating about arbitrary axes and finding the angle between vectors we are ready to write the equation to move from an arbitrary frame of reference to the frame of rotation. The steps are require that we first find the center and axis of rotation. We then generate a transformation matrix that takes us to the global coordinate frame. Finally, we translate to the desired center of rotation in the global frame. This location will likely be 0,0,0 but for completeness an arbitrary center may be arbitrary.

$$\text{AlignAxes}(c_1, a_1, c_2, a_2) := \begin{vmatrix} v_r \leftarrow \text{Unit}(a_1 \times a_2) \\ \text{angle}_r \leftarrow \text{VectorAngle}(a_1, a_2) \\ m_r \leftarrow R_{\text{Axis}}(v_r, \text{angle}_r) \\ m_t \leftarrow Tv(-c_1) \\ m_{\text{center}} \leftarrow Tv(c_2) \\ m_{\text{center}} \cdot m_r \cdot m_t \end{vmatrix}$$

This function makes a matrix that takes you from the c1,a1 frame to the c2,a2 coordinate frame.

$$ax_1 := \text{Unit}\begin{pmatrix} \text{rnd}(1) \\ \text{rnd}(1) \\ \text{rnd}(1) \end{pmatrix} \quad ax_1 = \begin{pmatrix} 0.146 \\ 0.982 \\ 0.118 \end{pmatrix} \quad cn_1 := \begin{pmatrix} 1 \\ 2 \\ 3 \\ 1 \end{pmatrix} \quad cn_{11} := \begin{pmatrix} cn_{1_0} + ax_{1_0} \\ cn_{1_1} + ax_{1_1} \\ cn_{1_2} + ax_{1_2} \\ 1 \end{pmatrix} \quad cn_{11} = \begin{pmatrix} 1.146 \\ 2.982 \\ 3.118 \\ 1 \end{pmatrix} \quad ax_2 := \begin{pmatrix} 1 \\ 0 \\ 0 \end{pmatrix} \quad cn_2 := \begin{pmatrix} 2 \\ 1 \\ 0 \\ 1 \end{pmatrix}$$

$$T_g := \text{AlignAxes}(cn_1, ax_1, cn_2, ax_2) \quad T_g = \begin{pmatrix} 0.146363 & 0.98213 & 0.118311 & -0.465558 \\ -0.98213 & 0.158573 & -0.101362 & 1.969069 \\ -0.118311 & -0.101362 & 0.98779 & -2.642334 \\ 0 & 0 & 0 & 1 \end{pmatrix}$$

$$T_g \cdot cn_1 = \begin{pmatrix} 2 \\ 1 \\ 0 \\ 1 \end{pmatrix}$$

$$T_g \cdot cn_{11} = \begin{pmatrix} 3 \\ 1 \\ 0 \\ 1 \end{pmatrix}$$

$$|cn_1 - cn_{11}| = 1$$

What is claimed is:

1. A method for providing calibrated geometric data from a three dimensional measurement system, the method comprising:

providing a reference object having a predetermined geometric structure;

providing reference object geometric structure data in a first coordinate frame, wherein the reference object geometric structure data corresponds to the predetermined geometric structure;

providing a three dimensional measurement system comprising:

a measurement element that measures geometric data in a second coordinate frame from the reference object and from a target object; and a motion system that provides relative motion between the reference object and the measurement element, wherein the relative motion occurs in a third coordinate frame, wherein the three dimensional measurement system provides motion data in the third coordinate frame corresponding to the relative motion;

acquiring a geometric data set comprising the measured geometric data from the reference object by the measurement element as a result of the relative motion provided by the motion system, wherein the geometric data set further comprises the motion data;

determining a first transformational relationship between the second coordinate frame and the third coordinate frame, wherein the first transformational relationship is determined using the measured geometric data and the motion data contained within the geometric data set, and using the reference object geometric structure data; and providing calibrated geometric data in a single coordinate frame from the target object by using the first transformational relationship.

2. The method of claim 1, further determining a second transformational relationship between the first coordinate frame and the third coordinate frame, wherein the first and second transformational relationships are both determined using the measured geometric data and the motion data contained within the geometric data set, and using the reference object geometric structure data.

3. The method of claim 2, wherein the first and second transformational relationships are iteratively determined in an alternating fashion.

4. The method of claim 1, wherein the calibrated geometric data is provided in the third coordinate frame by using the first transformational relationship to transform the measured geometric data within the geometric data set into transformed geometric data residing in the third coordinate frame, and then subsequently transforming the transformed geometric data using the motion data within the geometric data set to obtain the calibrated geometric data in the third coordinate frame.

5. The method of claim 2, wherein the calibrated geometric data is provided in the third coordinate frame by using the first transformational relationship to transform the measured geometric data within the geometric data set into transformed geometric data residing in the third coordinate frame, and then subsequently transforming the transformed geometric data using the motion data within the geometric data set to obtain the calibrated geometric data in the third coordinate frame.

6. The method of claim 1, wherein the measurement element comprises a laser scanner.

7. The method of claim 1, wherein the measurement element provides only substantially two dimensional measured geometric data.

8. The method of claim 1, wherein the motion system comprises a linear translation stage.

9. The method of claim 1, wherein the motion system comprises a rotary motion stage.

10. The method of claim 1, wherein the measurement element is rigidly attached to a movable portion of the motion system.

11. The method of claim 1, wherein the reference object is rigidly attached to a movable portion of the motion system.

12. The method of claim 1, wherein the reference object is in a static pose relative to the third coordinate frame.

13. The method of claim 1, wherein the predetermined geometric structure includes substantially planar facets.

14. The method of claim 1, wherein the predetermined geometric structure includes at least one pyramid shaped element.

15. The method of claim 1, wherein the predetermined geometric structure includes at least one truncated pyramid shaped element.

16. The method of claim 1, wherein the predetermined geometric structure includes elements forming a step gauge.

17. The method of claim 1, wherein the predetermined geometric structure includes elements forming a step gauge, wherein the elements forming the step gauge comprise substantially parallel facets which are substantially planar.

18. The method of claim 1, wherein the predetermined geometric structure includes at least one substantially planar facet which is oriented at substantially 45 degrees with respect to at least one adjacent substantially planar facet.

19. The method of claim 1, wherein the predetermined geometric structure includes at least one substantially planar facet which is oriented at substantially 90 degrees with respect to at least one adjacent substantially planar facet.

20. The method of claim 1, wherein the measurement element provides three dimensional measured geometric data.

21. A method for providing calibrated geometric data from a three dimensional measurement system, the method comprising:

providing a reference object having a predetermined geometric structure;

providing reference object geometric structure data in a first coordinate frame, wherein the reference object geometric structure data corresponds to the predetermined geometric structure;

providing a three dimensional measurement system comprising:

a measurement element that measures geometric data in a second coordinate frame from the reference object and from a target object;

a first support system that supports the measurement element, wherein the first support system resides within a third coordinate frame, wherein the first support system is capable of supporting the measurement element in at least a first element position and a second element position; and a second support system that supports the reference object, wherein the second support system resides within a fourth coordinate frame, wherein the second support system is capable of supporting the reference object in at least a first object position and a second object position;

wherein a first relative motion occurs between the measurement element and the reference object, wherein the three dimensional measurement system provides first motion data corresponding to the first relative motion, wherein the first motion data includes either or both first position data in the third coordinate frame from the first support system and first position data in the fourth coordinate frame from the second support system; and wherein a second relative motion occurs between the measurement element and the reference object, wherein the three dimensional measurement system provides second motion data corresponding to the second relative motion, wherein the second motion data includes either or both second position data in the third coordinate frame from the first support system and second position data in the fourth coordinate frame from the second support system;

acquiring a first geometric data set comprising first measured geometric data from the reference object by the measurement element as a result of the first relative motion, wherein the first geometric data set further comprises the first motion data;

acquiring a second geometric data set comprising second measured geometric data from the reference object by the measurement element as a result of the second relative motion, wherein the second geometric data set further comprises the second motion data;

determining both a first transformational relationship between the second coordinate frame and the third coordinate frame, and a second transformational relationship between the first coordinate frame and the third coordinate frame, wherein both the first transformational relationship and the second transformational relationship are determined using the first measured geometric data and the first motion data contained within the first geometric data set, and using the reference object geometric structure data;

determining both a third transformational relationship between the second coordinate frame and the third coordinate frame, and a fourth transformational relationship between the first coordinate frame and the third coordinate frame, wherein both the third transformational relationship and the fourth transformational relationship are determined using the second measured geometric data and the second motion data contained within the second geometric data set, and using the reference object geometric structure data;

determining a fifth transformational relationship between the third coordinate frame and the fourth coordinate frame, wherein the fifth transformational relationship is determined using the second transformational relationship and the fourth transformational relationship; and providing calibrated geometric data in a single coordinate frame from the target object by using the fifth transformational relationship and using either or both of the first transformational relationship and the third transformational relationship.

22. The method of claim 21, wherein the first and second transformational relationships are iteratively determined in an alternating fashion, and the third and fourth transformational relationships are iteratively determined in an alternating fashion.

23. The method of claim 21, wherein a third relative motion occurs between the measurement element and the target object, wherein third measured geometric data is acquired from the target object by the measurement element as a result of the third relative motion, wherein the three dimensional measurement system provides third motion data corresponding to the third relative motion, wherein the third motion data includes either or both third position data in the third coordinate frame from the first support system and third position data in the fourth coordinate frame from the second support system, wherein the three dimensional measurement system provides calibrated geometric data within the fourth coordinate frame by using either or both of the first transformational relationship and the third transformational relationship to transform the third measured geometric data into transformed geometric data residing in the third coordinate frame, and then subsequently transforming the transformed geometric data using the third motion data to obtain further transformed geometric data within the third coordinate frame, and then subsequently using the fifth transformational relationship to transform the further transformed geometric data from the third coordinate frame into the fourth coordinate frame to obtain yet further transformed geometric data, and then subsequently transforming the yet further transformed geometric data using the third motion data.

24. The method of claim 21, wherein the measurement element comprises a laser scanner.

25. The method of claim 21, wherein the measurement element provides only substantially two dimensional measured geometric data.

26. The method of claim 21, wherein the first support system comprises a linear translation stage.

27. The method of claim 21, wherein the second support system comprises a linear translation stage.

28. The method of claim 21, wherein the first support system comprises a rotary motion stage.

29. The method of claim 21, wherein the second support system comprises a rotary motion stage.

30. The method of claim 26, wherein the measurement element is rigidly attached to a movable portion of the first support system.

31. The method of claim 29, wherein the reference object is rigidly attached to a movable portion of the second support system.

32. The method of claim 21, wherein the reference object is in a first static pose relative to the third coordinate frame during the acquiring of the first geometric data set, and wherein the reference object is in a second static pose relative to the third coordinate frame during the acquiring of the second geometric data set.

33. The method of claim 21, wherein the predetermined geometric structure includes substantially planar facets.

34. The method of claim 21, wherein the predetermined geometric structure includes at least one pyramid shaped element.

35. The method of claim 21, wherein the predetermined geometric structure includes at least one truncated pyramid shaped element.

36. The method of claim 21, wherein the predetermined geometric structure includes elements forming a step gauge.

37. The method of claim 21, wherein the predetermined geometric structure includes elements forming a step gauge, wherein the elements forming the step gauge comprise substantially parallel facets which are substantially planar.

38. The method of claim 21, wherein the predetermined geometric structure includes at least one substantially planar facet which is oriented at substantially 45 degrees with respect to at least one adjacent substantially planar facet.

39. The method of claim 21, wherein the predetermined geometric structure includes at least one substantially planar facet which is oriented at substantially 90 degrees with respect to at least one adjacent substantially planar facet.

40. The method of claim 21, wherein the measurement element provides three dimensional measured geometric data.

41. The method of claim 21, wherein the providing of the calibrated geometric data in the single coordinate frame from the target object uses the fifth transformational relationship and uses an average of the first transformational relationship and the third transformational relationship.

* * * * *